US007647609B2

(12) United States Patent
Wachtfogel et al.

(10) Patent No.: US 7,647,609 B2
(45) Date of Patent: Jan. 12, 2010

(54) ADVERTISEMENTS IN AN END-USER CONTROLLED PLAYBACK ENVIRONMENT

(75) Inventors: Reuven Wachtfogel, Jerusalem (IL); Jonathan Maissel, Jerusalem (IL); Moshe Kranc, Jerusalem (IL); David Richardson, Jerusalem (IL); Ezra Darshan, Jerusalem (IL); Ron Katz, Jerusalem (IL); Yossi Tsuria, Jerusalem (IL); Sam Michelson, Jerusalem (IL); Mika Krause, Jerusalem (IL); Steve Epstein, Jerusalem (IL); Moshe Shlissel, Jerusalem (IL); Doron Handelman, Jerusalem (IL); Shlomo Kipnis, Jerusalem (IL); Chaim Shen-Orr, Jerusalem (IL)

(73) Assignee: NDS Limited, Middlesex (GB)

(*) Notice: Subject to any disclaimer, the term of this patent is extended or adjusted under 35 U.S.C. 154(b) by 0 days.

(21) Appl. No.: 12/006,402

(22) Filed: Jan. 2, 2008

(65) Prior Publication Data

US 2008/0109842 A1     May 8, 2008

Related U.S. Application Data

(62) Division of application No. 09/914,747, filed as application No. PCT/IL01/00035 on Jan. 14, 2001, now Pat. No. 7,340,760.

(60) Provisional application No. 60/176,215, filed on Jan. 14, 2000, provisional application No. 60/179,968, filed on Feb. 3, 2000.

(51) Int. Cl.
*H04N 7/10*     (2006.01)

(52) U.S. Cl. .............................. 725/34; 725/25; 725/32; 725/42; 725/135

(58) Field of Classification Search .................. 725/34, 725/25, 32, 42, 135
See application file for complete search history.

(56) References Cited

U.S. PATENT DOCUMENTS

| 4,107,734 A | 8/1978 | Percy et al. |
| 4,308,554 A | 12/1981 | Percy et al. |
| 4,602,279 A | 7/1986 | Freeman |

(Continued)

FOREIGN PATENT DOCUMENTS

EP     0656728     6/1995

(Continued)

OTHER PUBLICATIONS

U.S. Appl. No. 10/445,074, filed Jan. 15, 2008, Notice of Allowance.

(Continued)

*Primary Examiner*—John W Miller
*Assistant Examiner*—Sumaiya A Chowdhury
(74) *Attorney, Agent, or Firm*—Ladas & Parry LLP

(57) ABSTRACT

This invention discloses a method for displaying advertisements transmitted to a user unit, the method includes receiving, at the user unit, at least one advertisement tagged with a delay tag indicating whether display of the at least one advertisement can be delayed and only if the delay tag allows delaying display of the at least one advertisement, storing the at least one advertisement at the user unit, retrieving the at least one advertisement and displaying the at least one advertisement. A billing system for reporting a commercial broadcast to a multiplicity of users is also disclosed.

17 Claims, 13 Drawing Sheets

U.S. PATENT DOCUMENTS

| | | | |
|---|---|---|---|
| 4,677,466 A | 6/1987 | Lert, Jr. et al. | |
| 4,745,468 A | 5/1988 | Von Kohorn | |
| 4,876,592 A | 10/1989 | Von Kohorn | |
| 4,888,638 A | 12/1989 | Bohn | |
| 4,905,080 A | 2/1990 | Watanabe et al. | |
| 4,926,255 A | 5/1990 | Von Kohorn | |
| 4,930,158 A | 5/1990 | Vogel | 380/5 |
| 5,034,807 A | 7/1991 | Von Kohorn | |
| 5,057,915 A | 10/1991 | Von Kohorn | |
| 5,128,752 A | 7/1992 | Von Kohorn | |
| 5,227,874 A | 7/1993 | Von Kohorn | |
| 5,235,643 A | 8/1993 | Anderson et al. | 380/33 |
| 5,249,044 A | 9/1993 | Von Kohorn | |
| 5,260,778 A | 11/1993 | Kauffman et al. | |
| 5,282,249 A | 1/1994 | Cohen et al. | |
| 5,325,183 A | 6/1994 | Rhee | 348/528 |
| 5,373,440 A | 12/1994 | Cohen et al. | |
| 5,410,326 A | 4/1995 | Goldstein | |
| 5,412,416 A | 5/1995 | Nemirofsky | |
| 5,414,773 A | 5/1995 | Handelman | 380/49 |
| 5,446,919 A | 8/1995 | Wilkins | |
| 5,481,294 A | 1/1996 | Thomas et al. | |
| 5,481,609 A | 1/1996 | Cohen et al. | |
| 5,483,276 A | 1/1996 | Brooks et al. | |
| 5,488,423 A | 1/1996 | Walkingshaw et al. | |
| 5,504,519 A | 4/1996 | Remillard | |
| 5,530,469 A | 6/1996 | Garfinkle | |
| 5,539,450 A | 7/1996 | Handelman | |
| 5,539,822 A | 7/1996 | Lett | |
| 5,550,681 A | 8/1996 | Mazarac | |
| 5,555,308 A | 9/1996 | Levien | |
| 5,566,353 A | 10/1996 | Cho et al. | |
| 5,585,858 A | 12/1996 | Harper et al. | |
| 5,592,212 A | 1/1997 | Handelman | |
| 5,619,250 A | 4/1997 | McClellan et al. | |
| 5,635,978 A | 6/1997 | Alten et al. | |
| 5,640,192 A | 6/1997 | Garfinkle | |
| 5,664,948 A | 9/1997 | Dimitriadis et al. | 434/307 R |
| 5,666,645 A | 9/1997 | Thomas et al. | |
| 5,715,315 A | 2/1998 | Handelman | 380/49 |
| 5,721,827 A | 2/1998 | Logan et al. | |
| 5,724,521 A | 3/1998 | Dedrick | |
| 5,737,527 A | 4/1998 | Shiels et al. | |
| 5,759,101 A | 6/1998 | Von Kohorn | |
| 5,760,821 A | 6/1998 | Ellis et al. | |
| 5,761,601 A | 6/1998 | Nemirofsky et al. | |
| 5,761,648 A | 6/1998 | Golden et al. | |
| 5,774,170 A * | 6/1998 | Hite et al. | 725/34 |
| 5,774,186 A | 6/1998 | Brodsky et al. | |
| 5,786,845 A | 7/1998 | Tsuria | |
| 5,819,092 A | 10/1998 | Ferguson et al. | 395/701 |
| 5,855,008 A | 12/1998 | Goldhaber et al. | 705/14 |
| 5,911,029 A | 6/1999 | Sakaguchi et al. | |
| 5,937,392 A | 8/1999 | Alberts | 705/14 |
| 5,946,664 A | 8/1999 | Ebisawa | |
| 5,970,469 A | 10/1999 | Scroggie et al. | |
| 5,978,013 A | 11/1999 | Jones et al. | |
| 5,999,688 A | 12/1999 | Iggulden et al. | |
| 6,018,612 A | 1/2000 | Thomason et al. | |
| 6,057,872 A | 5/2000 | Candelore | |
| 6,064,978 A | 5/2000 | Gardner et al. | |
| 6,070,145 A | 5/2000 | Pinsley et al. | |
| 6,075,551 A | 6/2000 | Berezowski et al. | |
| 6,075,971 A | 6/2000 | Williams et al. | |
| 6,078,328 A | 6/2000 | Schumann et al. | |
| 6,119,098 A | 9/2000 | Guyot et al. | 705/14 |
| 6,141,530 A | 10/2000 | Rabowsky | |
| 6,160,570 A | 12/2000 | Sitnik | |
| 6,172,712 B1 | 1/2001 | Beard | |
| 6,177,931 B1 * | 1/2001 | Alexander et al. | 725/52 |
| 6,208,801 B1 | 3/2001 | Kambayashi et al. | |
| 6,285,987 B1 | 9/2001 | Roth et al. | 705/27 |
| 6,373,534 B1 | 4/2002 | Yasuki et al. | |
| 6,377,745 B2 | 4/2002 | Akiba et al. | |
| 6,446,262 B1 | 9/2002 | Malaure et al. | |
| 6,463,585 B1 | 10/2002 | Hendricks et al. | |
| 6,490,000 B1 | 12/2002 | Schaefer et al. | |
| 6,496,857 B1 | 12/2002 | Dustin et al. | |
| 6,536,041 B1 | 3/2003 | Knudson et al. | |
| 6,588,015 B1 | 7/2003 | Eyer et al. | |
| 6,640,239 B1 | 10/2003 | Gidwani | |
| 6,681,393 B1 | 1/2004 | Bauminger et al. | |
| 6,698,020 B1 * | 2/2004 | Zigmond et al. | 725/34 |
| 6,806,889 B1 | 10/2004 | Malaure et al. | |
| 2001/0049820 A1 | 12/2001 | Barton | |
| 2002/0095676 A1 | 7/2002 | Knee et al. | |
| 2002/0144262 A1 | 10/2002 | Plotnick et al. | |
| 2002/0166123 A1 | 11/2002 | Schrader et al. | |
| 2002/0176702 A1 | 11/2002 | Frantz | |
| 2003/0037332 A1 * | 2/2003 | Chapin et al. | 725/35 |
| 2003/0079226 A1 | 4/2003 | Barrett | |
| 2003/0110499 A1 | 6/2003 | Knudson et al. | |
| 2003/0154128 A1 | 8/2003 | Liga et al. | |
| 2004/0103429 A1 | 5/2004 | Carlucci et al. | |
| 2008/0282285 A1 | 11/2008 | Thomas et al. | |

FOREIGN PATENT DOCUMENTS

| | | |
|---|---|---|
| EP | 0 680 214 | 11/1995 |
| EP | 0 680 214 A2 | 11/1995 |
| EP | 0680214 | 11/1995 |
| EP | 0 405 776 B1 | 3/1997 |
| EP | 0 847 156 A2 | 6/1998 |
| EP | 0847156 | 6/1998 |
| EP | 0967804 | 12/1999 |
| EP | 1 003 313 A1 | 5/2000 |
| EP | 1 005 885 A1 | 6/2000 |
| EP | 0 998 145 B1 | 3/2002 |
| GB | 2 192 297 | 1/1988 |
| GB | 2 328 825 A | 3/1999 |
| WO | 96/15603 | 5/1996 |
| WO | 97/02537 | 1/1997 |
| WO | 9712486 | 4/1997 |
| WO | 9717774 | 5/1997 |
| WO | 97/20279 | 6/1997 |
| WO | 9901984 | 1/1999 |
| WO | WO 99/01984 | 1/1999 |
| WO | 9943111 | 8/1999 |
| WO | WO 99/43111 | 8/1999 |
| WO | 9945702 | 9/1999 |
| WO | WO 99/56473 | 11/1999 |
| WO | 99/66719 | 12/1999 |
| WO | 0001149 | 1/2000 |
| WO | WO 00/01149 | 1/2000 |
| WO | 00/10327 | 2/2000 |
| WO | WO 00/10327 | 2/2000 |
| WO | WO 00/18114 | 3/2000 |
| WO | WO 01/11865 A1 | 2/2001 |
| WO | WO 01/33847 A1 | 5/2001 |
| WO | WO 01/35669 A1 | 5/2001 |
| WO | 01/47279 | 6/2001 |
| WO | WO 01/52541 A1 | 7/2001 |
| WO | 03/067394 | 8/2003 |

OTHER PUBLICATIONS

U.S. Appl. No. 10/786,652, filed Jan. 15, 2008, Notice of Allowance.
U.S. Appl. No. 11/093,858, filed Feb. 7, 2008, Final Office Action.
Australian App. No. 2003247424, (Counterpart to U.S. Appl. No. 10/445,273), Examiner's Report, Dec. 18, 2007.
Chinese App. No. 03811770.3, (Counterpart to U.S. Appl. No. 10/445,273), Office Action, Nov. 16, 2007.

Chinese App. No. 03811770.3, (Counterpart to U.S. Appl. No. 10/445,273), Response to Office Action, Jan. 29, 2008.

Eurasian App. No. 200401548, (Counterpart to U.S. Appl. No. 10/445,273), Response to Official Action, Nov. 16, 2007.

Eurasian App. No. 200401549, (Counterpart to U.S. Appl. No. 10/445,074), Response to Official Action, Jan. 18, 2008.

Eurasian App. No. 200401549, (Counterpart to U.S. Appl. No. 10/445,074), Official Action, Jan. 22, 2008.

Hu et al., "Capacitive and textural characteristics of polyaniline-platinum composite films," Electrochimica Acta, 47, pp. 2741-2749 (2002).

http://nds.com/solutions/value_at_tv.html (Jun. 12, 2001).

Office Action of Aug. 19, 2009 in corresponding U. S. Appl. No. 12/006,392.

* cited by examiner

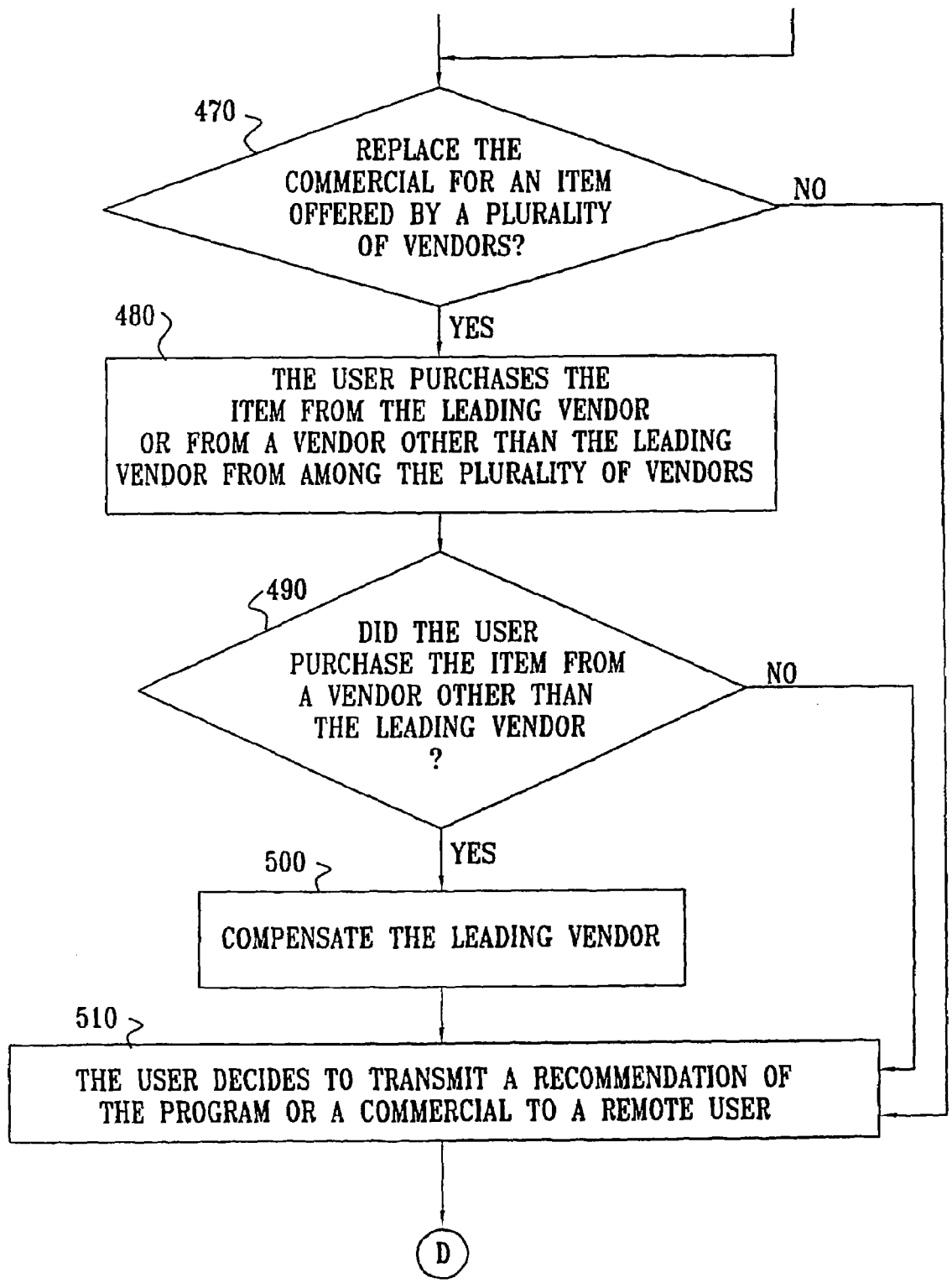

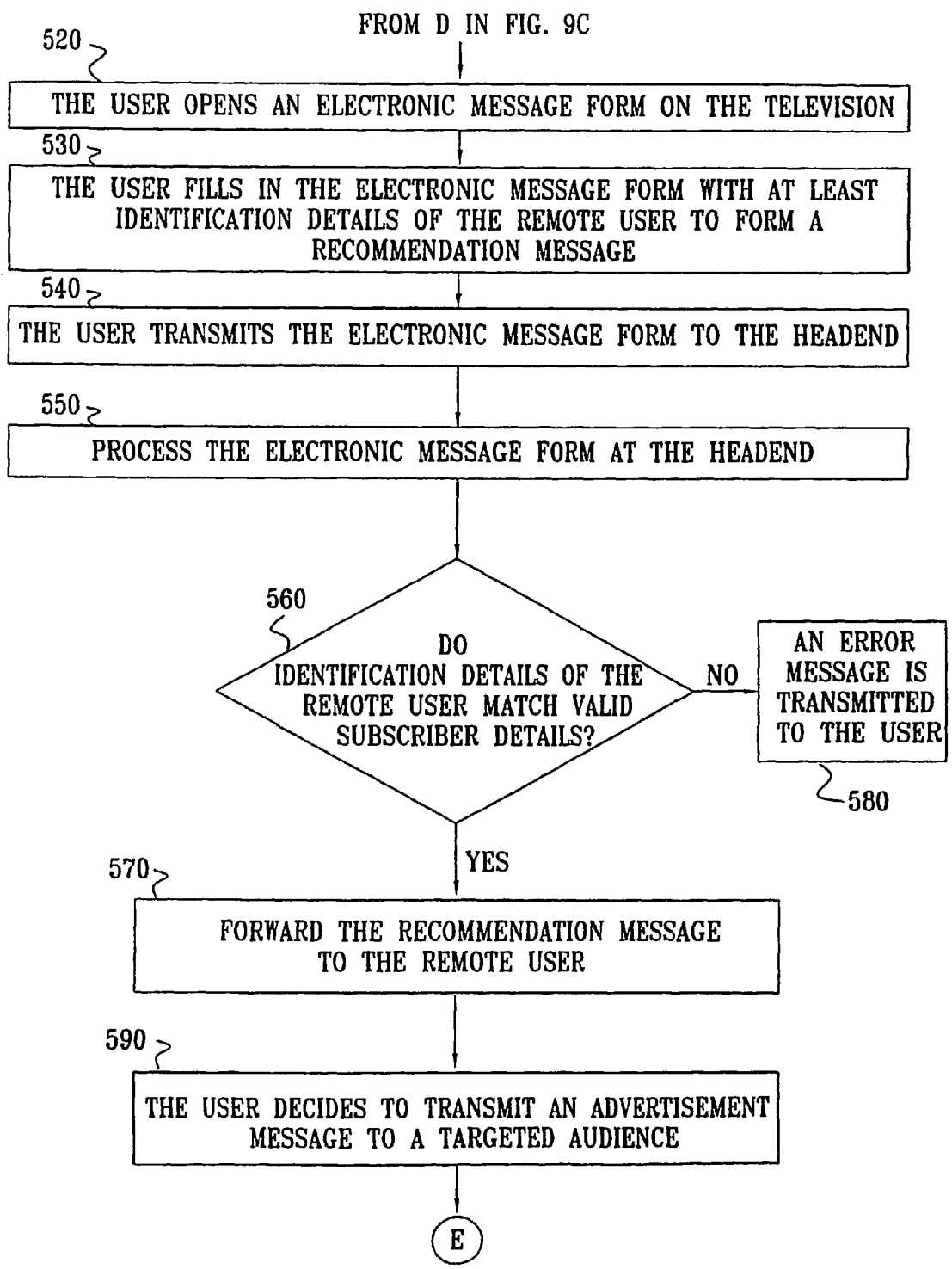

ADVERTISEMENTS IN AN END-USER CONTROLLED PLAYBACK ENVIRONMENT

The present application is a divisional application of application Ser. No. 09/914,747, filed Nov. 27, 2001 now U.S. Pat. No. 7,340,760 which is a 35 USC §371 application of PCT/IL01/00035, filed on 14 Jan. 2001 and entitled "Advertisements in an End-User Controlled Playback Environment", which was published on 19 Jul. 2001 in the English language with International Publication Number WO 01/52541 A1.

The nonprovisional application designated above, namely application Ser. No. 09/914,747 filed on Nov. 27, 2001, claims the benefit of U.S. Provisional Application No. 60/176,215 filed Jan. 14, 2000 and 60/179,968 filed Feb. 3, 2000.

FIELD OF THE INVENTION

The present invention generally relates to digital television.

BACKGROUND OF THE INVENTION

Conventional techniques for digital television recording which are available today typically enable recording of programs and advertisements or commercials associated with the programs. Conventional techniques, such as techniques using a standard home video cassette recorder (VCR), allow manual manipulation of programs and advertisements or commercials associated with the programs.

Some aspects of technologies that may be useful in understanding the present invention are described in the following patents and patent applications:

U.S. Pat. Nos. 5,414,773 and 5,715,315 to Handelman which describe a CATV system including a CATV network, a multiplicity of subscriber units, apparatus for transmitting over said CATV network encrypted information individually addressed to a subscriber unit and apparatus associated with each of the multiplicity of subscriber units for decoding the encrypted information addressed thereto;

U.S. patent application Ser. No. 09/515,118 to Wachtfogel et al and corresponding published PCT Application WO 00/01149 both assigned to NDS Limited which describe a digital television recording method comprising: broadcasting a television program associated with a broadcaster set of parameters enabling access to a first set of predetermined portions of the program; operating an agent for determining whether to record the program and for associating with the program, upon recording of the program, an agent set of parameters enabling access to a second set of predetermined portions of the program; storing the program together with the broadcaster set of parameters and the agent set of parameters to generate an addressable program; retrieving at least a portion of the addressable program; displaying the at least a portion of the addressable program to a user; receiving from the user a user set of parameters enabling access to a third set of predetermined portions of the addressable program; editing the addressable program to include said user set of parameters enabling access to the third set of predetermined portions of the addressable program thereby generating an edited addressable program; and storing the edited addressable program; and Israel Patent Application 121230, submitted 3 Jul. 1997 and corresponding published PCT Application WO 99/01984 both assigned to NDS Limited which describe one system for using intelligent agents to customize an electronic program guide (EPG) based on user behavior.

U.S. Provisional Patent Applications 60/179,968 and 60/176,215 to Wachtfogel et al, the disclosures of which are hereby incorporated herein by reference, describe automated targeting and provisioning of advertisements in an end-user controlled playback environment.

The disclosures of all references mentioned above and throughout the present specification are hereby incorporated herein by reference.

SUMMARY OF THE INVENTION

The present invention seeks to provide improved methods and apparatus for manipulating programs and commercials and for enabling interactive operations on programs and commercials.

The existing techniques for dealing with advertisements do not enable useful manipulations of the programs and the commercials, such as controlling displaying of commercials, delaying displaying of commercials, selecting commercials to be displayed, and so forth.

The existing techniques also do not enable interactive operations such as transmission of recommendations to watch programs or commercials to friends. Thus, it is appreciated that techniques that will enable such manipulations and interactive operations will be highly desired.

In a preferred embodiment of the present invention, a program and a set of commercials to be played during program breaks are encrypted and prepared at a headend for transmission to a plurality of user units. Metadata to be associated with the program and the commercials is preferably encrypted for protection and transmitted together with the program and the set of commercials in a broadcast digital stream.

The metadata preferably includes data relating the commercials to the program and to other possible programs or pieces of broadcast content, content-related data that provides information about the program, and various types of tags, such as the following: delay tags indicating whether display of the commercials can be delayed; tags indicating valid vendors associated with frames displaying advertised items in order to prevent replacement of a commercial for an item offered by a plurality of vendors; and replacement tags indicating whether replacement of displaying commercials by displaying of alternative commercials associated therewith is allowed. If replacement of commercials for an item offered by a plurality of vendors is enabled, the metadata may also include links associating commercials with selection icons associated with a leading vendor from among a plurality of vendors.

The broadcast digital stream is preferably received at a user unit and, based upon predetermined criteria or criteria determined in real-time, the program may be displayed without delay or stored in the user unit for future display to a user of the user unit.

The commercials are preferably detected and stored or displayed without delay. The user is preferably enabled to manipulate stored commercials and/or interact with the commercials once such stored commercials are detected. The user may thus perform at least one of the following operations: delay displaying of a commercial; replace displaying of the commercial by displaying of an alternative commercial; and operate a selection icon to purchase the item from the leading vendor or from a vendor other than the leading vendor from among the plurality of vendors. In a case where the user purchases the item from a vendor other than the leading vendor, the leading vendor may be compensated. The user may also preferably transmit a recommendation of the program or a commercial to a remote user and/or transmit an advertisement message to a targeted audience.

There is thus provided in accordance with a preferred embodiment of the present invention a method for displaying advertisements transmitted to a user unit, the method including receiving, at the user unit, at least one advertisement tagged with a delay tag indicating whether display of the at least one advertisement can be delayed, and only if the delay tag allows delaying display of the at least one advertisement: storing the at least one advertisement at the user unit, retrieving the at least one advertisement, and displaying the at least one advertisement.

Further in accordance with a preferred embodiment of the present invention the method also includes displaying the at least one advertisement without delay if the delay tag does not allow delaying display of the at least one advertisement.

Still further in accordance with a preferred embodiment of the present invention the delay tag also indicates whether a user of the user unit can control display of the at least one advertisement, and the displaying includes, only if the delay tag indicates that the user can control display of the at least one advertisement: retrieving the at least one advertisement in response to a selection made by the user, and displaying the at least one advertisement.

Additionally in accordance with a preferred embodiment of the present invention the delay tag also indicates a maximum allowed delay time period for displaying the at least one advertisement, and the displaying includes displaying the at least one advertisement after the maximum allowed delay time period elapses if the at least one advertisement had not been displayed before the maximum allowed delay time period elapsed.

Moreover in accordance with a preferred embodiment of the present invention the delay tag also indicates a non-advertising programming (NAP) threshold defining a maximum amount of NAP that may be displayed before the at least one advertisement must be displayed, and the displaying includes determining an amount of NAP that has already been displayed, and displaying the at least one advertisement without delay if the amount of NAP that has already been displayed is greater than or equal to the NAP threshold.

Further in accordance with a preferred embodiment of the present invention the amount of NAP is defined by an accumulated time of display of NAP.

Still further in accordance with a preferred embodiment of the present invention the delay tag is assigned a guaranteed delivery attribute that forces the at least one advertisement to be displayed eventually.

Additionally in accordance with a preferred embodiment of the present invention the delay tag is assigned the guaranteed delivery attribute in response to a payment for assigning the guaranteed delivery attribute.

There is thus provided in accordance with another preferred embodiment of the present invention a method for displaying advertisements transmitted to a user unit, the method including receiving, at the user unit, at least one advertisement tagged with a tag indicating a non-advertising programming (NAP) threshold which defines a maximum amount of NAP that may be displayed before the at least one advertisement must be displayed, determining an amount of NAP that has already been displayed at the user unit, and displaying the at least one advertisement without delay if the amount of NAP that has already been displayed at the user unit is greater than or equal to the NAP threshold.

Further in accordance with a preferred embodiment of the present invention t the amount of NAP is defined by an accumulated time of display of NAP.

Still further in accordance with a preferred embodiment of the present invention t the NAP includes a plurality of categorized NAP elements $NAP_1, \ldots, NAP_n$ having n separate weight factors where n is an index, and the amount of NAP is defined by a weighted sum of time of display of all the categorized NAP elements $NAP_1, \ldots, NAP_n$.

Additionally in accordance with a preferred embodiment of the present invention each of the plurality of categorized NAP elements $NAP_1, \ldots NAP_n$ is associated with a service-level determining a quality-of-service (QoS).

Moreover in accordance with a preferred embodiment of the present invention t each weight factor i in the n separate weight factors is inversely related to an amount of payment for a corresponding $NAP_i$.

Further in accordance with a preferred embodiment of the present invention each weight factor i in the n separate weight factors is inversely proportional to an amount of payment for a corresponding $NAP_i$.

Still further in accordance with a preferred embodiment of the present invention the amount of NAP is directly related to a number of viewing points that are accumulated by a user viewing the NAP.

Additionally in accordance with a preferred embodiment of the present invention the displaying includes: determining that the at least one advertisement is currently at the top of a play-list queue of advertisements to be displayed, and displaying the at least one advertisement without delay in accordance with a result of the determining.

There is thus provided in accordance with another preferred embodiment of the present invention a method for displaying advertisements transmitted to a user unit, the method includes: receiving, at the user unit, at least one advertisement associated with at least one alternative advertisement, the at least one advertisement being tagged with a replacement tag indicating whether a user of the user unit is allowed to replace displaying of the at least one advertisement by displaying of the at least one alternative advertisement, and displaying one of the at least one advertisement and the at least one alternative advertisement in accordance with a value of the replacement tag and a selection of the user.

Further in accordance with a preferred embodiment of the present invention the method also including, prior to the displaying: determining that the at least one advertisement and the at least one alternative advertisement are not competing advertisements, and performing the displaying based, at least in part, on a result of the determining.

Still further in accordance with a preferred embodiment of the present invention the replacement tag also provides an archiving indication indicating which one of the at least one advertisement and the at least one alternative advertisement is to be archived, and the method also includes archiving one of the at least one advertisement and the at least one alternative advertisement based on the archiving indication.

Additionally in accordance with a preferred embodiment of the present invention the archiving includes archiving one of the at least one advertisement and the at least one alternative advertisement in response to payment by an advertiser of a corresponding one of the at least one advertisement and the at least one alternative advertisement.

There is thus provided in accordance with another preferred embodiment of the present invention a method for enabling a first user to transmit a recommendation of a transmitted program to a second user via a communication network, the method includes: opening an electronic message form on a display, the electronic message form including an identification of the transmitted program if the transmitted program is at least one of the following highlighted, marked, and viewed by the first user, filling in the electronic message form to form a recommendation message, the filling in including filling in at least identification details of the second user, transmitting, via the communication network, the electronic message form to a headend of the communication network, processing, at the headend, the electronic form to match the identification details of the second user with valid subscriber details, and forwarding the recommendation message to the second user in response to a positive match of the identification details of the second user with valid subscriber details.

Further in accordance with a preferred embodiment of the present invention the filling in also includes filling in authorization data authorizing the headend to bill the first user for the second user viewing the transmitted program in response to the recommendation message.

Still further in accordance with a preferred embodiment of the present invention the authorization data includes a selection of a method of payment.

Additionally in accordance with a preferred embodiment of the present invention the method of payment includes one of the following payment from a bank account, payment by a credit card, and payment by debiting a smart card.

Moreover in accordance with a preferred embodiment of the present invention the filling in also includes filling in program related information including at least one of the following a title of the transmitted program, an identification of a recommended episode, a date and a time of creation of the recommendation message, parental rating of the transmitted program, and a viewing rating assigned to the transmitted program by the first user.

Further in accordance with a preferred embodiment of the present invention the transmitted program includes an advertisement.

Still further in accordance with a preferred embodiment of the present invention the processing includes verifying an entitlement of the first user to provide the recommendation message to the second user.

Additionally in accordance with a preferred embodiment of the present invention the verifying is performed at least one of the following: the headend, a removable security element at a user unit operated by the first user, and a removable security element at a user unit operated by the second user.

Moreover in accordance with a preferred embodiment of the present invention at least one of the removable security elements includes a smart card.

Further in accordance with a preferred embodiment of the present invention the processing includes verifying an entitlement of the second user to receive the recommendation message from the first user.

Still further in accordance with a preferred embodiment of the present invention the method also includes attaching a video clip message to the recommendation message prior to the transmitting the electronic message form to the headend.

Additionally in accordance with a preferred embodiment of the present invention the method also includes assigning the transmitted program a high viewing priority for the second user in response to the forwarding the recommendation message to the second user.

Moreover in accordance with a preferred embodiment of the present invention the high viewing priority includes a highest viewing priority.

Further in accordance with a preferred embodiment of the present invention the forwarding includes: transmitting the recommendation message to the second user if the second user is served by the headend, and transmitting the recommendation message to an information service provider that serves the second user if the second user is not served by the headend.

Still further in accordance with a preferred embodiment of the present invention a method also including enabling the second user to block reception of the recommendation message.

There is thus provided in accordance with another preferred embodiment of the present invention a payment method for a pay television system, the method includes billing a user by a sum of money which is a calculated by subtracting, from a predetermined price for a program, a result of a substitution of an actual duration-of-display of advertisements associated with the program in a predetermined arithmetic function that correlates the predetermined price for the program to a predetermined duration-of-display of advertisements associated with the program.

There is thus provided in accordance with still another preferred embodiment of the present invention a method for counteracting replacement of advertisements for an item offered by a plurality of vendors, the method includes associating a frame displaying the item with a tag indicating a valid vendor, and preventing replacement of the item by other than the valid vendor.

Further in accordance with a preferred embodiment of the present invention a method also including, prior to the associating, encrypting the tag.

There is thus provided in accordance with another preferred embodiment of the present invention a method for replacing advertisements for an item offered by a plurality of vendors, the method includes: displaying an advertisement of the item associated with a selection icon associated with a leading vendor from among the plurality of vendors, displaying offers to purchase the item by the leading vendor and by vendors from the plurality of vendors other than the leading vendor upon selection of the selection icon, and compensating the leading vendor for a purchase of the item from a vendor other than the leading vendor.

Further in accordance with a preferred embodiment of the present invention the compensating includes at least one of the following: crediting an account of the leading vendor, and crediting an amount of advertisements of the leading vendor.

There is thus provided in accordance with another preferred embodiment of the present invention a personal advertisement method for enabling a user to transmit an advertisement message to a targeted audience, the method includes: creating an advertisement message, associating the advertisement message with parameters determining the targeted audience, transmitting the advertisement message associated with the parameters determining the targeted audience to a headend, processing, at the headend, the advertisement message and the parameters determining the targeted audience to create an advertisement transmission program scheduled for broadcast to the targeted audience, and broadcasting the advertisement program to the targeted audience.

Further in accordance with a preferred embodiment of the present invention the method also includes associating the advertisement message with parameters determining at least one of the following: an expiration date of the advertisement message, a delivery mode determining a priority of broadcast of the advertisement transmission program, and a method of payment for broadcasting the advertisement transmission program.

Still further in accordance with a preferred embodiment of the present invention the parameters determining the targeted audience include at least one of the following an age group of viewers, residence areas of viewers, a pre-specified field of interest of viewers, an income level of viewers, gender of viewers, and types of programs being watched by viewers.

Additionally in accordance with a preferred embodiment of the present invention the method of payment includes one of the following: payment from a bank account, payment by a credit card, and payment by debiting a debit card.

Moreover in accordance with a preferred embodiment of the present invention the debit card includes a smart card.

There is thus provided in accordance with another preferred embodiment of the present invention a method for detecting a broadcast commercial in a broadcast digital stream, the method includes detecting indicia in metadata added to the broadcast digital stream, the indicia indicating at least one of the following a start point of the commercial, an end point of the commercial, and a presence point within the commercial.

There is thus provided in accordance with still another preferred embodiment of the present invention a method for detecting a broadcast commercial in a broadcast digital stream, the method includes performing an analysis on content of the broadcast digital stream to detect parameters characterizing the commercial.

Further in accordance with a preferred embodiment of the present invention, the parameters include at least one of the following: an indication of a sequence of a length typical to a broadcast commercial, an indication of a repetition of a sequence of a length typical to a broadcast commercial, an indication of a sequence of a length typical to a broadcast commercial at predetermined times known to be likely to include commercial breaks, an indication of a sequence of a length typical to a broadcast commercial between program events, and an indication of a sequence of a length typical to a broadcast commercial within a program event.

There is thus provided in accordance with another preferred embodiment of the present invention a method for detecting a broadcast commercial in a broadcast digital stream, the method includes performing an analysis on a user behavior during display of the broadcast digital stream to detect behavior characteristics associated with user behavior during display of commercials.

There is thus provided in accordance with still another preferred embodiment of the present invention a method for storing a broadcast commercial for future display to a user, the method including determining whether to store the broadcast commercial based upon at least one of the following a predetermined preference of the user for an item being advertised in the commercial, a previous purchase of an item being advertised in the commercial, and correspondence of at least one characteristic associated with the commercial to user profile information, and storing the broadcast commercial in response to a result of the determining.

There is thus provided in accordance with yet another preferred embodiment of the present invention a method for displaying a stored broadcast commercial to a user, the method including determining whether to display the broadcast commercial based upon at least one of the following metadata associated with content displayed to the user which indicates when a potential commercial occurs, a required frequency of a commercial break, a time of day, a time window during which the broadcast commercial is valid, analysis of an event, a request of the user, and an indication of the user that he has viewed enough, and displaying the broadcast commercial in response to a result of the determining.

There is thus provided in accordance with another preferred embodiment of the present invention a method for selecting a stored broadcast commercial for displaying to a user, the method includes determining whether to select the broadcast commercial based upon at least one of the following a number of times the commercial has already been displayed to the user, a number of times other commercials advertising the same item advertised by the commercial have already been displayed to the user, a type of product advertised in the commercial, an event currently being viewed, an offer induced by metadata, a relation to other commercials, a predetermined date, and position in a sequence of teaser commercials, and selecting the commercial for displaying to the user in response to a result of the determining.

There is thus provided in accordance with still another preferred embodiment of the present invention a method for protecting metadata added to a broadcast digital stream, the method includes encrypting the metadata prior to broadcast to users, and enabling decrypting of the metadata in response to performance of an authorization procedure.

Further in accordance with a preferred embodiment of the present invention the authorization procedure includes at least one of the following an authentication procedure authenticating a transmitting entity, and a co-dependency procedure correlating the metadata to content.

There is thus provided in accordance with another preferred embodiment of the present invention a billing method associated with a broadcast commercial broadcast to a multiplicity of users, the method including receiving reports corresponding to the commercial from at least some of the plurality of users, and performing at least one of the following in response to the receiving crediting the at least some of the plurality of users by an amount of credit, and charging an advertiser of the commercial by an amount of charge.

Further in accordance with a preferred embodiment of the present invention the amount of credit includes a predetermined amount of credit.

Still further in accordance with a preferred embodiment of the present invention the predetermined amount of credit includes a fixed amount of credit.

Additionally in accordance with a preferred embodiment of the present invention the amount of charge is proportional to a number of the reports.

There is thus provided in accordance with another preferred embodiment of the present invention a method for enabling a user to search advertisements transmitted to a user unit, the method including receiving, at the user unit, a plurality of advertisements including at least a sub-group of advertisements in which each advertisement is associated with an advertisement category tag categorizing the advertisement according to types of items advertised in the advertisement, and displaying, in response to a selection made by the user when viewing at least one advertisement from the sub-group of advertisements, identification elements of all advertisements in the sub-group, each identification element in the sub-group enabling the user to select an advertisement associated therewith.

Further in accordance with a preferred embodiment of the present invention the displaying includes simultaneously displaying the identification elements of at least some of the advertisements in the sub-group.

Still further in accordance with a preferred embodiment of the present invention each identification element includes at least one of the following an icon identifying an advertisement in the sub-group, an index identifying an advertisement in the sub-group, a code identifying an advertisement in the sub-group, an image from an advertisement in the sub-group, and a video clip of an advertisement in the sub-group.

Additionally in accordance with a preferred embodiment of the present invention the identification elements are arranged in a mosaic display.

There is thus provided in accordance with another preferred embodiment of the present invention a method for purchasing an item via a communication network, the item being offered by a plurality of vendors and advertised in advertisements provided by the plurality of vendors, the method includes determining one of the plurality of vendors as a leading vendor in response to a payment by the leading vendor, displaying the advertisements of the item and an offer to purchase the item from the leading vendor, and enabling users to purchase the item via the communication network only from the leading vendor.

There is thus provided in accordance with still another preferred embodiment of the present invention a method for deleting a stored broadcast commercial, the method includes determining whether to delete the broadcast commercial based upon at least one of the following: a pre-determined elapsed time period of the broadcast commercial, a number of times the broadcast commercial has been displayed, in response to receipt of an erase signal, a request of a user not to present commercials of a particular vendor, and a payment made to prevent the stored broadcast commercial from being deleted, and deleting the broadcast commercial in response to a result of the determining.

Further in accordance with a preferred embodiment of the present invention the deleting includes transmitting a delete trigger signal in a secure mode.

There is thus provided in accordance with another preferred embodiment of the present invention a user unit for displaying transmitted advertisements, the user unit including a receiver operative to receive at least one advertisement tagged with a delay tag indicating whether display of the at least one advertisement can be delayed, a memory, a display, and a controller operatively associated with the receiver, the memory and the display and operative to store the at least one advertisement in the memory only if the delay tag allows delaying display of the at least one advertisement, and to retrieve the at least one advertisement from the memory for displaying the at least one advertisement on the display.

There is thus provided in accordance with still another preferred embodiment of the present invention a user unit for displaying transmitted advertisements, the user unit including a receiver operative to receive at least one advertisement tagged with a tag indicating a non-advertising programming (NAP) threshold which defines a maximum amount of NAP that may be displayed on a display before the at least one advertisement must be displayed, and a controller operatively associated with the receiver and operative to determine an amount of NAP that has already been displayed, and to provide the at least one advertisement without delay to the display for display thereby if the amount of NAP that has already been displayed is greater than or equal to the NAP threshold.

There is thus provided in accordance with yet another preferred embodiment of the present invention a user unit for displaying transmitted advertisements, the user unit including a receiver for receiving at least one advertisement associated with at least one alternative advertisement, the at least one advertisement being tagged with a replacement tag indicating whether a user of the user unit is allowed to replace displaying of the at least one advertisement by displaying of the at least one alternative advertisement, and a controller operatively associated with the receiver and operative to provide one of the at least one advertisement and the at least one alternative advertisement to a display for display thereby in accordance with a value of the replacement tag and a selection of the user.

There is thus provided in accordance with another preferred embodiment of the present invention a user unit for enabling a first user to transmit a recommendation of a transmitted program to a second user via a communication network, the user unit including a processor operative to generate an electronic message form and to provide the electronic message form to an on-screen display (OSD) unit for display on a display, the electronic message form including an identification of the transmitted program if the transmitted program is at least one of the following highlighted, marked, and viewed by the first user, an input/output (I/O) interface operatively associated with the processor and operative to receive from the first user information filling in the electronic message form for producing a recommendation message, the information including at least identification details of the second user, and a communication interface operatively associated with the processor and operative to transmit the electronic message form including the information to a headend of the communication network for forwarding by the headend to the second user in response to a positive match of the identification details of the second user with valid subscriber details.

There is thus provided in accordance with still another preferred embodiment of the present invention a billing system in a pay television system, the billing system including a processor operative to calculate a sum of money by subtracting, from a predetermined price for a program, a result of a substitution of an actual duration-of-display of advertisements associated with the program in a predetermined arithmetic function that correlates the predetermined price for the program to a predetermined duration-of-display of advertisements associated with the program, and accounting apparatus operatively associated with the processor and operative to bill the user by the sum of money There is thus provided in accordance with yet another preferred embodiment of the present invention a transmission system for counteracting replacement of advertisements for an item offered by a plurality of vendors, the system including a multiplexer operative to associate a frame displaying the item with a tag indicating a valid vendor, and a transmitter operatively associated with the multiplexer and operative to transmit the frame in association with the tag.

There is thus provided in accordance with another preferred embodiment of the present invention a user unit for replacing advertisements for an item offered by a plurality of vendors, the user unit including a display, and a processor operatively associated with the display and operative to display on the display an advertisement of the item associated with a selection icon associated with a leading vendor from among the plurality of vendors and offers to purchase the item by the leading vendor and by vendors from the plurality of vendors other than the leading vendor upon selection of the selection icon, and to compensate the leading vendor for a purchase of the item from a vendor other than the leading vendor.

There is thus provided in accordance with still another preferred embodiment of the present invention a user unit for enabling a user to transmit an advertisement message to a targeted audience, the user unit including an input/output (I/O) interface, a processor operatively associated with the I/O interface and operative to create an advertisement message in response to input inputted via the I/O interface and to associate the advertisement message with parameters determining the targeted audience, and a communication interface operatively associated with the processor and operative to transmit the advertisement message associated with the parameters determining the targeted audience to a headend for creating an advertisement transmission program to be broadcast to the targeted audience and for broadcasting the advertisement program to the targeted audience.

There is thus provided in accordance with yet another preferred embodiment of the present invention a user unit for detecting a broadcast commercial in a broadcast digital stream, the user unit including a receiver operative to receive the broadcast digital stream including the broadcast commercial, and a detector operatively associated with the receiver and operative to detect indicia in metadata added to the broadcast digital stream, the indicia indicating at least one of the following a start point of the commercial, an end point of the commercial, and a presence point within the commercial.

There is thus provided in accordance with another preferred embodiment of the present invention a user unit for detecting a broadcast commercial in a broadcast digital stream, the user unit including a receiver operative to receive the broadcast digital stream including the broadcast commercial, and a processor operatively associated with the receiver and operative to perform an analysis on content of the broadcast digital stream to detect parameters characterizing the commercial.

There is thus provided in accordance with still another preferred embodiment of the present invention a user unit for detecting a broadcast commercial in a broadcast digital stream the user unit including a receiver operative to receive the broadcast digital stream including the broadcast commercial, and a processor operatively associated with the receiver and operative to perform an analysis on a user behavior during display of the broadcast digital stream to detect behavior characteristics associated with user behavior during display of commercials.

There is thus provided in accordance with yet another preferred embodiment of the present invention an apparatus for storing a broadcast commercial for future display to a user, the apparatus including a processor operative to determine whether to store the broadcast commercial based upon at least one of the following a predetermined preference of the user for an item being advertised in the commercial, a previous purchase of an item being advertised in the commercial, and correspondence of at least one characteristic associated with the commercial to user profile information, and a memory operatively associated with the processor and operative to store the broadcast commercial in response to a determination to store the broadcast commercial which is provided by the processor.

There is thus provided in accordance with another preferred embodiment of the present invention an apparatus at a user unit that is operative to enable displaying of a stored broadcast commercial to a user, the apparatus including a processor operative to determine whether to display the broadcast commercial based upon at least one of the following metadata associated with content displayed to the user which indicates when a potential commercial occurs, a required frequency of a commercial break, a time of day, a time window during which the broadcast commercial is valid, analysis of an event, a request of the user, and an indication of the user that he has viewed enough, and an on-screen display (OSD) unit operatively associated with the processor and operative to provide the broadcast commercial to a display for displaying the broadcast commercial on the display in response to a determination to display the broadcast commercial which is provided by the processor.

There is thus provided in accordance with still another preferred embodiment of the present invention an apparatus at a user unit that is operative to enable selection of a stored broadcast commercial for displaying to a user, the apparatus including a processor operative to determine whether to select the broadcast commercial based upon at least one of the following a number of times the commercial has already been displayed to the user, a number of times other commercials advertising the same item advertised by the commercial have already been displayed to the user, a type of product advertised in the commercial, an event currently being viewed, an offer induced by metadata, a relation to other commercials, a predetermined date, and position in a sequence of teaser commercials, and retrieval apparatus operatively associated with the processor and operative to select the commercial for displaying to the user in response to a determination to select the broadcast commercial which is provided by the processor.

There is thus provided in accordance with yet another preferred embodiment of the present invention an apparatus for protecting metadata added to a broadcast digital stream, the apparatus including an encryptor operative to encrypt the metadata to provide encrypted metadata prior to broadcast to users, and a processor operatively associated with the encryptor and operative to add authorization information to the encrypted metadata, wherein decryption of the metadata is enabled only in response to performance of an authorization procedure utilizing the authorization information.

There is thus provided in accordance with another preferred embodiment of the present invention a billing system including a receiver operative to receive, from at least one user, reports corresponding to a commercial broadcast to a multiplicity of users, and accounting apparatus operatively associated with the receiver and operative to perform at least one of the following in response to reception of the reports crediting the at least one user by an amount of credit, and charging an advertiser of the commercial by an amount of charge.

There is thus provided in accordance with still another preferred embodiment of the present invention an apparatus at a user unit that is operative to enable a user to search advertisements transmitted to the user unit, the apparatus including a receiver operative to receive a plurality of advertisements including at least a sub-group of advertisements in which each advertisement is associated with an advertisement category tag categorizing the advertisement according to types of items advertised in the advertisement, and a display, and a processor operatively associated with the display and the receiver and operative to display on the display, in response to a selection made by the user when viewing at least one advertisement from the sub-group of advertisements, identification elements of all advertisements in the sub-group, each identification element in the sub-group enabling the user to select an advertisement associated therewith.

There is thus provided in accordance with yet another preferred embodiment of the present invention a system for enabling purchase of an item via a communication network, the item being offered by a plurality of vendors and advertised in advertisements provided by the plurality of vendors, the system including a receiver operative to receive the advertisements with a determination of one of the plurality of vendors as a leading vendor in response to a payment by the leading vendor, and a processor operatively associated with the receiver and operative to display on a display the advertisements and an offer to purchase the item from the leading vendor while enabling users to purchase the item via the communication network only from the leading vendor.

There is thus provided in accordance with another preferred embodiment of the present invention an apparatus at a user unit that is operative to enable deletion of a stored broadcast commercial, the apparatus including a memory in which the broadcast commercial is stored, and a processor operatively associated with the memory and operative to provide a determination whether to delete the broadcast commercial based upon at least one of the following: a pre-determined elapsed time period of the broadcast commercial, a number of times the broadcast commercial has been displayed, in response to receipt of an erase signal, a request of a user not to present commercials of a particular vendor, and a payment made to prevent the stored broadcast commercial from being deleted, and to delete the broadcast commercial in response to the determination.

BRIEF DESCRIPTION OF THE DRAWINGS

The present invention will be understood and appreciated more fully from the following detailed description, taken in conjunction with the drawings in which:

FIGS. 9A-9E, taken together, comprise a simplified flowchart illustration of a preferred method of operation of the apparatus of FIGS. 1-3.

DETAILED DESCRIPTION OF A PREFERRED EMBODIMENT

Figure 1:
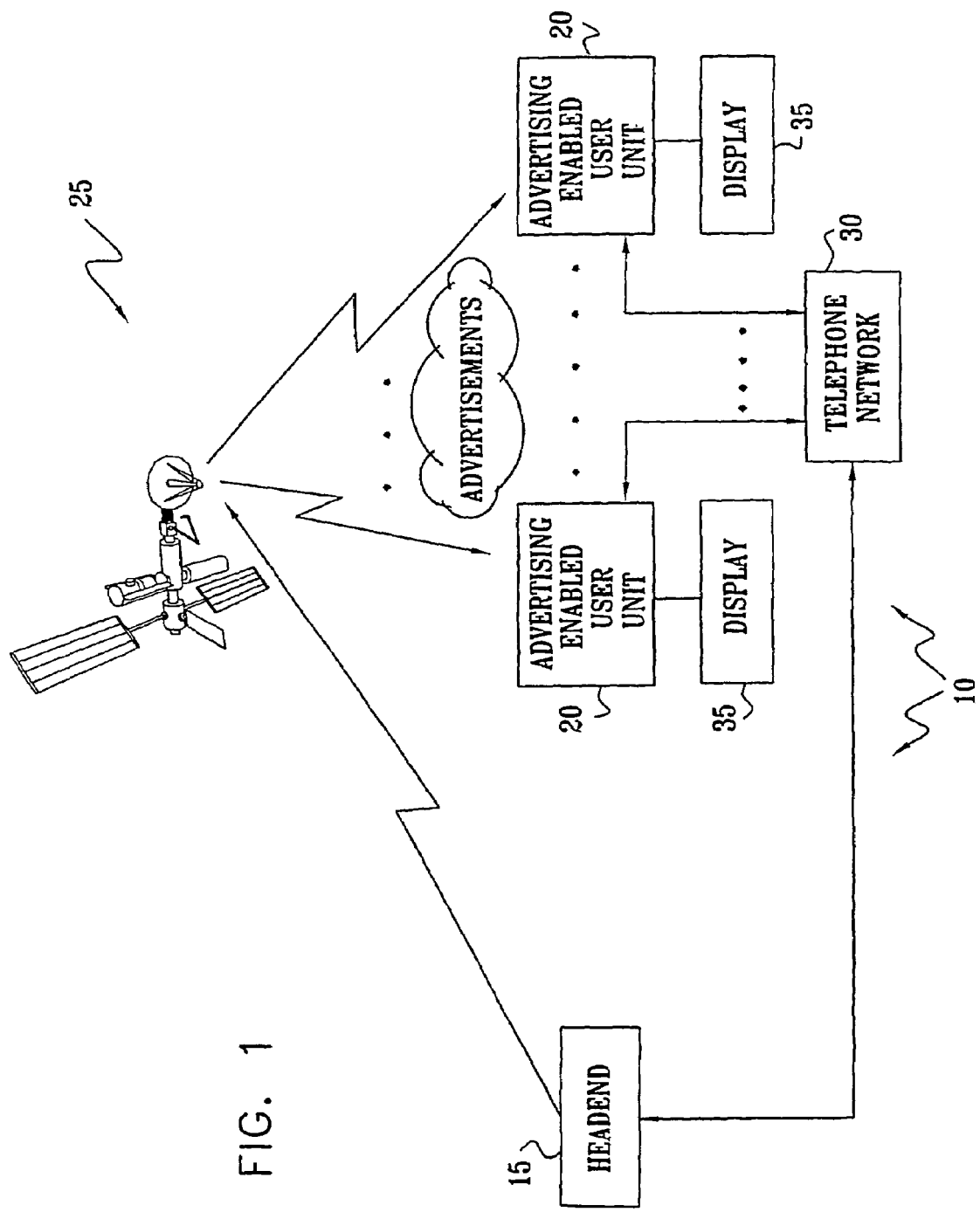
FIG. 1 is a simplified pictorial illustration of a preferred implementation of a digital television system constructed and operative in accordance with a preferred embodiment of the present invention.

Reference is now made to FIG. 1, which is a simplified pictorial illustration of a digital television system 10 constructed and operative in accordance with a preferred embodiment of the present invention.

The digital television system 10 preferably includes a headend 15 that transmits programs and advertisements or commercials to a plurality of advertising enabled user units 20 via a distribution medium such as a satellite 25. It is appreciated that any other appropriate distribution medium or combination of distribution media may be used in place of or in addition to the satellite 25. Without limiting the generality of the foregoing, appropriate distribution media may include any one or appropriate combination of the following: a telephone system, such as, for example, a public switched telephone system (PSTN) or a private telephone system; and cables such as, for example, coaxial cables or fiber optic cables.

The plurality of user units 20 may preferably communicate with the headend 15 via a return path that may be provided, for example, via a telephone network 30. Preferably, each user unit 20 is operatively associated with a display 35, such as a television display, for displaying the programs and advertisements or commercials transmitted from the headend 15.

The terms "advertisement" and "commercial" are interchangeably used throughout the specification and claims to include any form of broadcast information that is used to promote sale of an item or a product. An advertisement or commercial may thus include, for example, any one or more of the following, either separately or in any appropriate combination: a video clip; a still image; and audio such as, for example, audio associated with a video clip and/or a still image.

Figure 2:
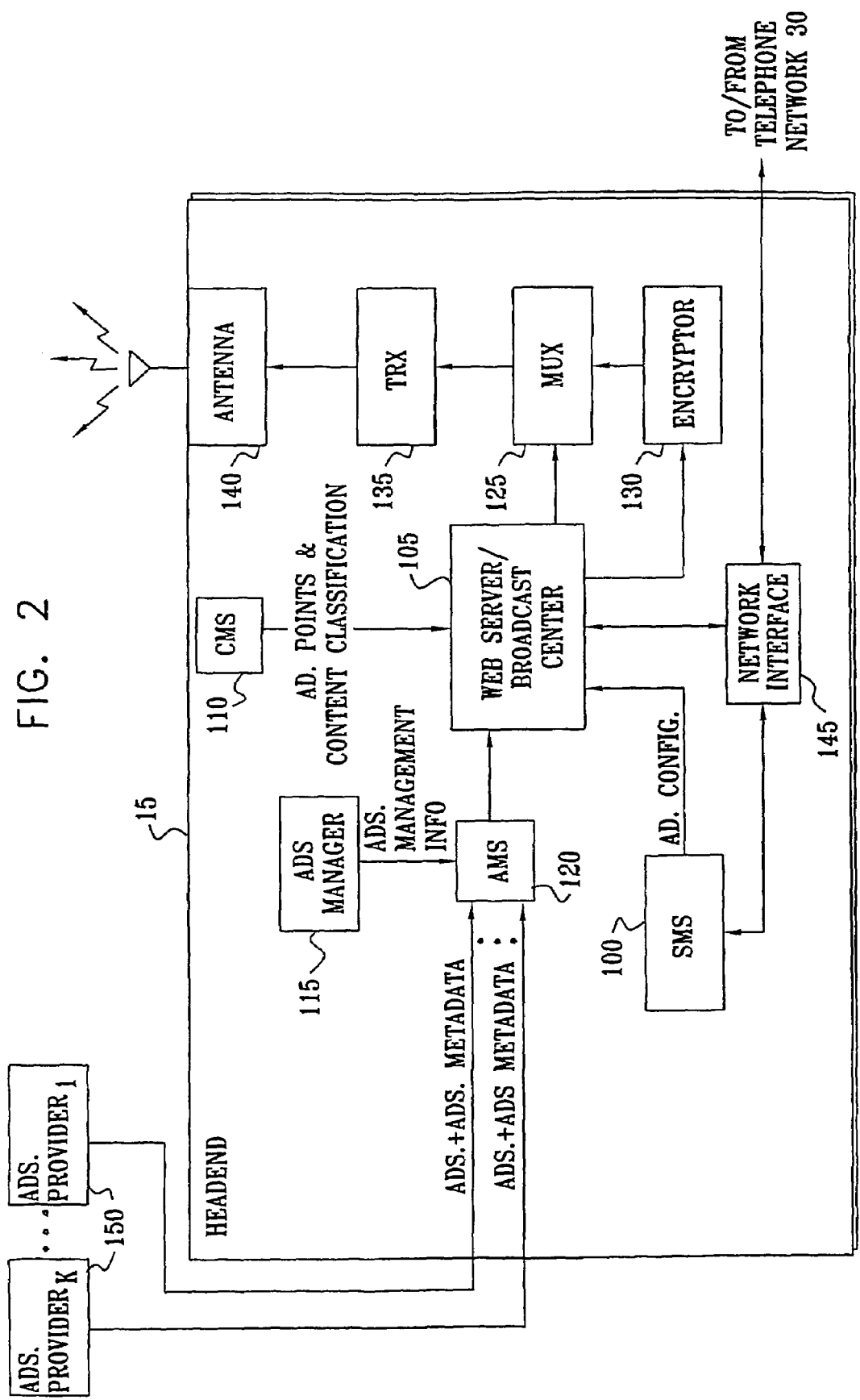
FIG. 2 is a simplified pictorial illustration of a preferred implementation of a headend in the digital television system of FIG. 1.

Reference is now additionally made to FIG. 2, which is a simplified pictorial illustration of a preferred implementation of the headend 15 in the digital television system 10 of FIG. 1. It is appreciated that the elements shown in FIG. 2 may be implemented in any appropriate combination of hardware and software, as is well known in the art.

The headend 15 preferably includes the following elements: a subscriber management system (SMS) 100; a world-wide-web (WWW) server or a broadcast center 105; a content manager system (CMS) 110; advertisements (Ads) manager 115; an advertisement (Ad) management system (AMS) 120; a multiplexer (125; an encryptor 130; a transmitter (TRX) 135; an antenna 140; and a network interface 145.

Preferably, the headend 15 communicates with an Ads or commercials generator 150 or with a plurality thereof. The Ads generators 150 may include generators (not shown) of commercials that are to be transmitted by the headend 15 to the user units 20. The generators of commercials may include, for example, film production equipment, video cameras and computers (all not shown) as is well known in the art. The Ads generators 150 preferably provide the commercials and metadata associated with the commercials to the AMS 120 which is preferably operative to apply management commands based on instructions provided by the Ads manager 115. The AMS 120 is preferably operative to provide the commercials to the broadcast center 105.

The term "metadata" is used throughout the specification and claims to include explanatory "text" and/or information and/or flags, icons and pointers to information that pertain to content in a digital broadcast stream and to users of the content, where the content in the broadcast digital stream typically includes television programs and/or commercials, but may also include other types of broadcast information such as the following: multimedia; audio; still images; computer-generated data and/or files; information from world wide web (WWW) sites; and video clips. The contents of the metadata may thus preferably pertain to at least one of the following: an individual user or a plurality of users; and a piece of content or a plurality of pieces of content. The term "user" is used throughout the specification and claims to include a client/subscriber user or a broadcaster/operator user.

The metadata may be used to enable operations of users on the programs and/or the commercials and/or other pieces of content and selection of scenes or portions from the programs and/or the commercials and/or the other pieces of content. For example, metadata may include one or more of the following: tags or pointers that point at locations in a program and at scenes within a program where a commercial must be played and also at programs and commercials; an indication of a genre of a program that enables to select suitable commercials to be played in commercial breaks or after specific scenes within the program; Ads configurations; content-related data that provides information about a program and is to be presented to a user, for example, in banners and overlays; and accumulated viewing information that enables a determination whether and when to display commercials and which commercials to display.

The term "Ad configuration" is used throughout the specification and claims to include attributes that are assigned to an advertisement and are tailored on a per user basis. Ad configurations are preferably generated by the SMS 100 and provided by the SMS 100 to the broadcast center 105, for example, according to users profile information, according to requests from users, or according to any other suitable criteria. One of the attributes assigned to each advertisement may include location of the advertisement in a play-list queue of advertisements to be displayed.

The broadcast center 105 preferably receives from the CMS 110 content classifications and a table associating viewing points with each commercial. The content classifications are preferably associated with classification of content items as programs or commercials. The viewing points preferably provide a weight to viewing of each commercial thereby quantifying commercial display time. For example, accumulation of a predetermined number of viewing points of commercials during a predetermined time period such as 8 hours by a viewer, may entitle the viewer to view programs without having to view additional commercials for two more hours. Alternatively, the viewing points may be associated with content and not with commercials as described herein below.

Preferably, the broadcast center 105 associates the content classifications to commercials and programs to be transmitted to the user units 20, and viewing points as required and Ads configurations to the commercials, thereby generating content that is prepared for transmission to the user units 20. Then, the broadcast center 105 preferably provides a portion of the content, which is to be encrypted, prepared for transmission to the user units 20, to the encryptor 130. The broadcast center 105 preferably provides the rest of the content, which is not to be encrypted, prepared for transmission to the user units 20, to the MUX 125.

The output of the encryptor 130 preferably includes an encrypted bit stream that is also preferably provided to the MUX 125. The MUX 125 is preferably operative to combine the content provided thereto by the broadcast center 105 with the encrypted bit stream provided by the encryptor 130 to produce a multiplexed digital stream of encrypted and non-encrypted information. The multiplexed digital stream is preferably provided to the transmitter 135 for broadcasting to the user units 20 via the antenna 140.

The terms "encrypt" and "decrypt" in all of their forms are used throughout the specification and claims to include all forms of information encryption/decryption ranging from simple scrambling/descrambling to hard encryption/decryption. In an analogous form, the term "encryptor" is used throughout the specification and claims to include apparatus that encrypts information, and the term "decrypter" is used throughout the specification and claims to include apparatus that decrypts information.

It is appreciated that the broadcast center 105 and the SMS 100 may communicate with the user units 20 over the telephone network 30 via the network interface 145, or through any other appropriate means. Typically, the telephone network 30 is used for the return path from the user units 20 to the headend 15, but it is appreciated that the headend 15 may also transmit information to the user units 20 via the telephone network 30.

Figure 3:
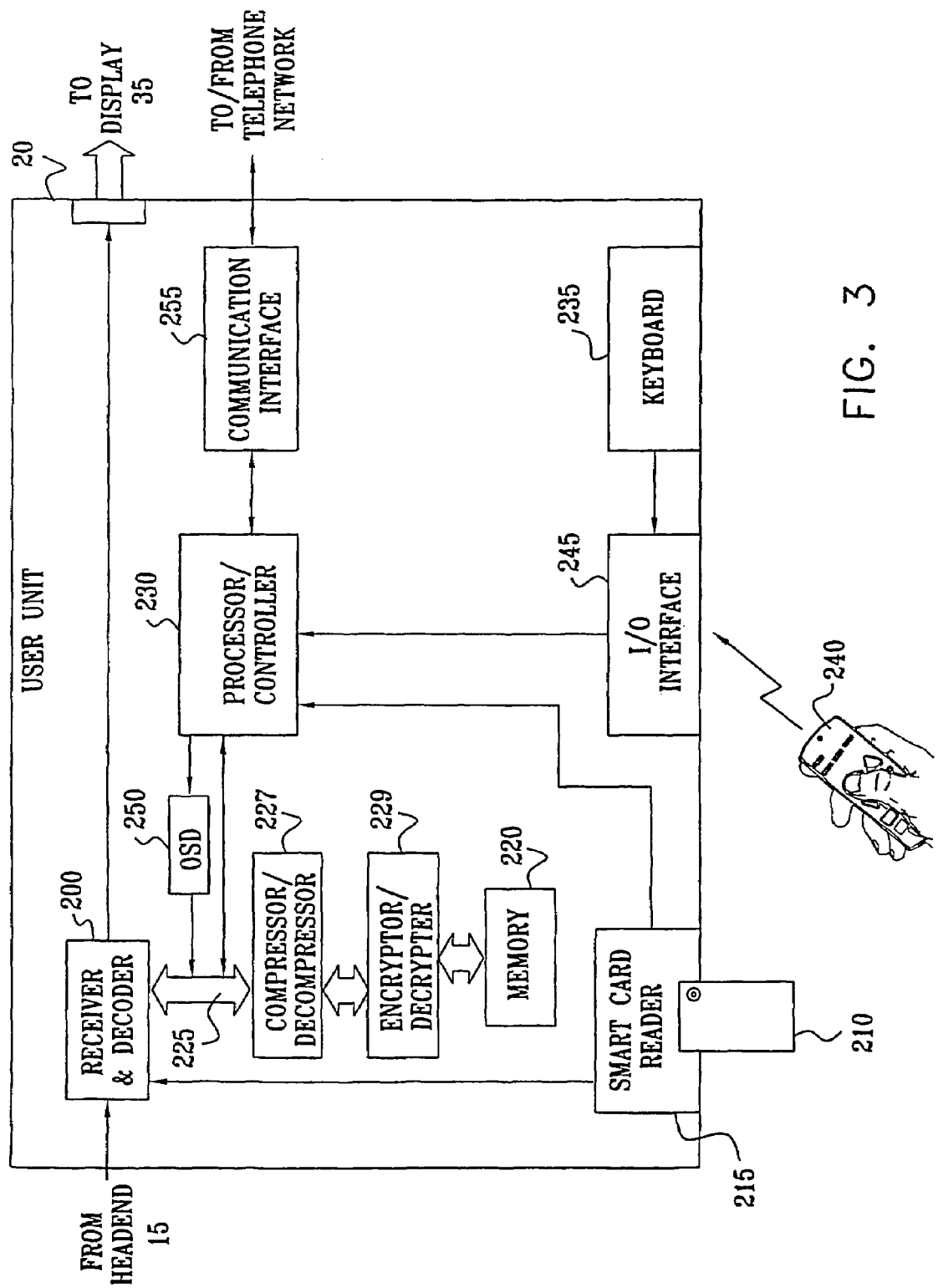
FIG. 3 is a simplified pictorial illustration of a preferred implementation of a user unit in the digital television system 10 of FIG. 1.

Reference is now made to FIG. 3 which is a simplified pictorial illustration of a preferred implementation of a user unit 20 in the digital television system 10 of FIG. 1, the user unit 20 being constructed and operative in accordance with a preferred embodiment of the present invention.

The user unit 20 is preferably operative to receive transmissions broadcast from the headend 15 of FIG. 1 at a receiver and decoder unit 200. Preferably, transmissions that are intended for immediate display are decrypted in the receiver and decoder 200 and provided to the display 35 of FIG. 1 for display thereon via an output port 205. It is appreciated that the receiver and decoder unit 200 may decrypt the transmissions, for example, under control of a removable security element, such as a smart card 210 that may be accessed via a smart card reader 215.

Preferably, transmissions that are not intended for immediate display are provided to a high capacity memory 220 for storage therein, for example, via a communication bus 225 and under control of a controller or processor 230. The processor 230 may preferably receive instructions from a user operating a keyboard 235 or a remote control 240 via an input/output (I/O) interface 245.

It is appreciated that the user unit 20 may optionally include a compressor/decompressor 227 and an encryptor/decrypter 229 for respectively compressing and encrypting the transmissions that are not intended for immediate display prior to storage in the memory 220. Upon retrieval of stored information from the memory 220, the encryptor/decrypter 229 preferably decrypts any retrieved encrypted information and the compressor/decompressor 227 preferably decompresses any retrieved compressed information.

Preferably, the processor 230 may provide messages and information to be overlaid on the display 35 to an on-screen-device (OSD) 250. The OSD 250 is preferably operative to prepare the messages and the information to be overlaid on the display 35 in a format suitable for display on the display 35, and to provide formatted messages and information to the display 35 via the communication bus 225. The processor 230 may also provide information and requests of the user to be transmitted to the headend 15 of FIG. 1 to a communication interface 255 that may include, for example, a modem.

The communication interface 255 is preferably operative to communicate with the headend 15 via the telephone network 30 of FIG. 1. Alternatively, the communication interface 255 may include any other suitable communication means that enable callback to the headend 15. For example, and without limiting the generality of the foregoing:

the communication interface 255 may include a very small aperture terminal (VSAT) (not shown), in which case the communication interface 255 communicates with the headend 15 via the satellite 25 of FIG. 1;

alternatively or additionally, the communication interface 255 may include a cellular telephone (not shown), in which case the communication interface 255 communicates with the headend 15 via a wireless communication network (not shown); and further alternatively or additionally, the communication interface 255 may include a cable modem (not shown), in which case the communication interface 255 communicates with the headend 15 via coaxial cables or fiber optic cables (not shown).

The operation of the apparatus of FIGS. 1-3 is now briefly described. Programs, commercials and metadata associated with the programs and the commercials are preferably broadcast from the headend 15. At the user units 20, the programs and commercials are preferably displayed on the displays 35, or stored for later display in the user units 20. The user units 20 then preferably enable users to manipulate the programs and the commercials and to perform interactive operations on the programs and commercials as described below.

The metadata may preferably be protected by encrypting the metadata in the encryptor 130 prior to broadcast to users thereby producing encrypted metadata. The transmitter 135 then transmits the encrypted metadata in association with the broadcast digital stream to the user units 20. At the user units 20, decrypting of the metadata is enabled in response to performance of an authorization procedure, for example, in removable security elements associated with the user units 20. The authorization procedure may preferably include at least one of the following: an authentication procedure authenticating a transmitting entity; and a co-dependency procedure correlating the metadata to content. Such protection of the metadata preferably prevents tampering with the metadata, or makes such tampering difficult.

When a broadcast digital stream including program material associated with at least one broadcast commercial and metadata is received at one of the user units 20, herein after referred to as "the addressed user unit 20", the receiver and decoder 200 at the addressed user unit 20 preferably receives the broadcast digital stream and detects the at least one broadcast commercial in order to enable interactivity with the at least one commercial and manipulations on the at least one commercial. The at least one commercial may preferably be detected by the processor 230 in the addressed user unit 20 which searches and detects indicia in the metadata that indicate at least one of the following: a start point of each commercial; an end point of each commercial; and a presence point within a commercial.

Alternatively, the processor 230 may detect the at least one commercial by performing an analysis on content of the broadcast digital stream to detect parameters characterizing the at least one commercial. The characterizing of the at least one commercial may include at least one of the following: an indication of a sequence of a length typical to a broadcast commercial; an indication of a repetition of a sequence of a length typical to a broadcast commercial; an indication of a sequence of a length typical to a broadcast commercial at predetermined times known to be likely to include commercial breaks; an indication of a sequence of a length typical to a broadcast commercial between program events; and an indication of a sequence of a length typical to a broadcast commercial within a program event.

Further alternatively, the processor 230 may detect the at least one commercial by performing an analysis on a user behavior during display of the broadcast digital stream to detect behavior characteristics associated with user behavior during display of commercials. Such user behavior may include, for example, frequent changes of channels, e.g., every 1-2 seconds.

It is appreciated that the at least one commercial may be broadcast in a plurality of forms, such as in configurations having various lengths, for example, a 30 seconds length or a 15 seconds length. In such a case, detection of the at least one commercial preferably includes detection of a current configuration of the at least one commercial.

In a preferred embodiment of the present invention the at least one commercial is tagged with a delay tag associated with the addressed user unit 20 and indicating whether a user of the addressed user unit 20 may delay display of the at least one commercial. Preferably, the processor 230 at the addressed user unit 20 analyzes the delay tag, and if the delay tag does not allow delaying display of the at least one commercial, the processor 230 preferably prevents storage of the at least one commercial and instructs the receiver and decoder 200 to display the at least one commercial on the display 35 without delay.

If, however, the delay tag allows delaying display of the at least one commercial, the processor 230 preferably stores the at least one commercial in the memory 220, optionally after compression and encryption in the compressor/decompressor 227 and the encryptor/decrypter 229 respectively. At a later time, and according to criteria predetermined or determined in real-time, the processor 230 preferably retrieves the at least one commercial from the memory 220, decrypts and decompresses the at least one commercial as necessary, and enables displaying of the at least one commercial on the display 35.

It is appreciated that the delay tag may also indicate whether a user of the addressed user unit 20 can control display of the at least one commercial. In such a case, and only if the delay tag indicates that the user can control display of the at least one commercial, the at least one commercial may be retrieved from the memory 220 and displayed on the display 35 in response to a selection made by the user.

The delay tag may also preferably indicate a maximum allowed delay time period for displaying the at least one commercial. In such a case, the processor 230 preferably imposes display of the at least one commercial after the maximum allowed delay time period elapses if the at least one commercial had not been displayed before the maximum allowed delay time period elapsed.

It is appreciated that a value assigned to the delay tag may be dependent on the length of the at least one commercial. For example, a standard 30 seconds length commercial may be delayed while a shorter commercial may not be delayed. Typically, a broadcast digital stream may include commercials having various lengths. Alternatively, the length of the at least one commercial may be defined by a separate commercial length tag that may be associated with the delay tag.

The at least one commercial received at the addressed user unit 20 may alternatively or additionally be tagged with a tag indicating a non-advertising programming (NAP) threshold which defines a maximum amount of NAP that may be displayed before the at least one commercial must be displayed. It is appreciated that the tag indicating a NAP threshold may be one of the following: separate from the delay tag; embodied in the delay tag; and associated with the delay tag.

Preferably, in a case where the at least one commercial is tagged with a tag indicating a NAP threshold, the processor 230 may determine an amount of NAP that has already been displayed at the addressed user unit 20, and provide the at least one commercial to the display 35 at the addressed user unit 20 for display thereon without delay if the amount of NAP that has already been displayed at the addressed user unit 20 is greater than or equal to the NAP threshold.

The amount of NAP may be defined by an accumulated time of display of NAP. Alternatively, the NAP may be composed of a plurality of categorized NAP elements $NAP_1, \ldots, NAP_n$ having n separate weight factors where n is an index, and the amount of NAP may be defined by a weighted sum of time of display of all the categorized NAP elements $NAP_1, \ldots, NAP_n$.

It is appreciated that each of the plurality of categorized NAP elements $NAP_1, \ldots, NAP_n$ may be associated with a service-level determining a quality-of-service (QoS). Alternatively, each weight factor i in the n separate weight factors may be inversely related, such as by being inversely proportional, to an amount of payment for a corresponding $NAP_i$. In such a way, a time period during which a user views a pay television program, which is typically free of commercials because the user has already paid for the pay television program, will have little influence on the timing of display of the at least one commercial.

It is appreciated that the NAP threshold may be related directly to the number of viewing points that are accumulated by the user of the addressed user unit 20. In such a case, the more viewing points the user accumulates by viewing commercials within a first time period, the more NAP is available to the user during a second time period.

In a case where viewing points as mentioned above with reference to FIG. 2 are associated with content, the NAP preferably corresponds to an amount of viewing points accumulated by the user viewing the NAP. Thus, when an amount of NAP that has already been displayed at the addressed user unit 20 exceeds the NAP threshold, that is when a current accumulation of viewing points exceeds a predetermined threshold of viewing points that corresponds to the NAP threshold, the at least one commercial must be displayed.

The delay tag may preferably be assigned a guaranteed delivery attribute that forces the at least one commercial to be displayed eventually, even if display of the at least one commercial is delayed. The delay tag is preferably assigned the guaranteed delivery attribute at the headend 15 in response to a payment for assigning the guaranteed delivery attribute, such payment being typically made by advertisers of the at least one commercial.

Figure 4:
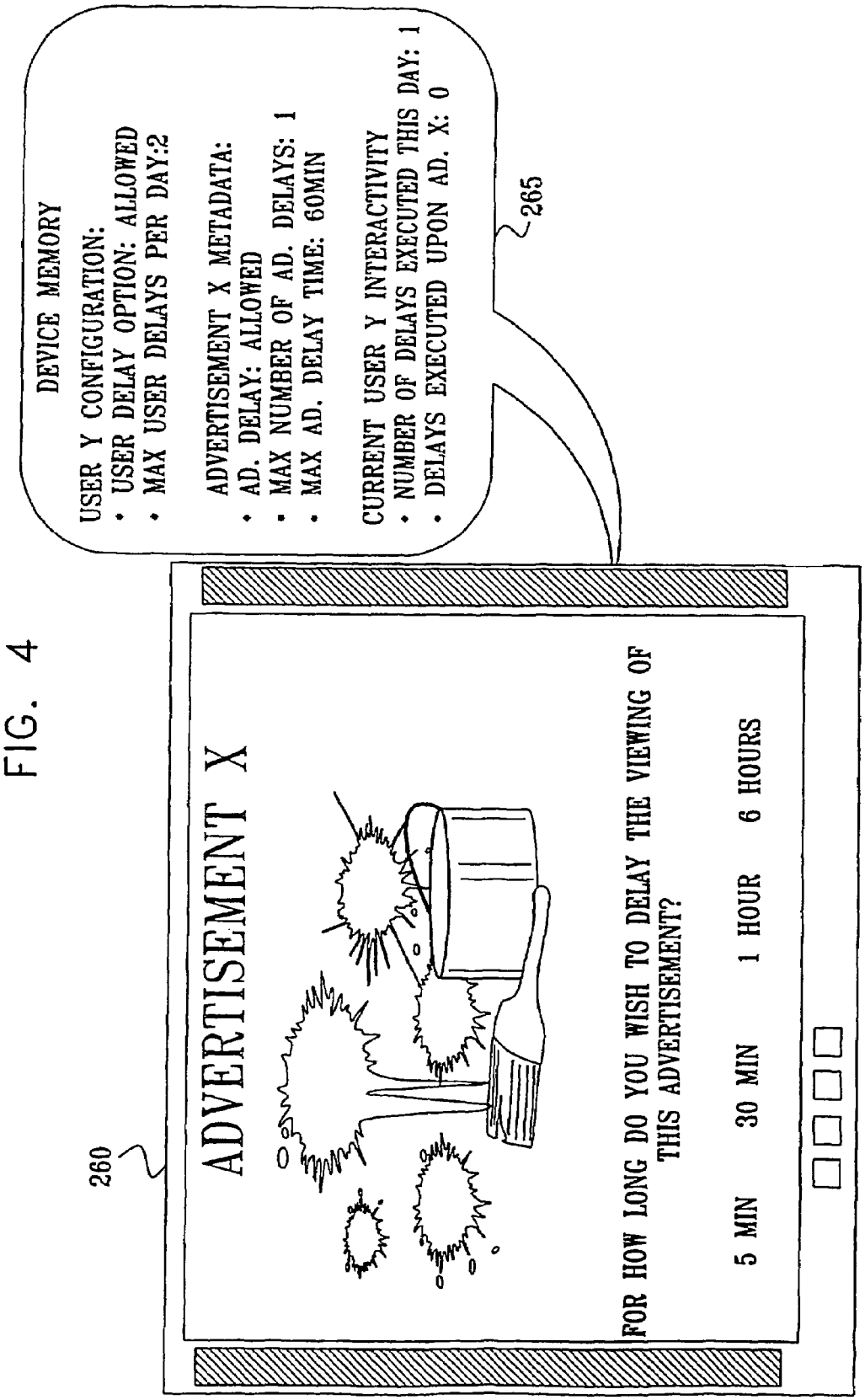
FIG. 4 is a simplified pictorial illustration of a preferred implementation of a television screen showing delay options for advertisements that may be available to a user of the user unit of FIG. 3.

An example showing a preferred implementation of a television screen 260 displaying delay options available to the user for a commercial tagged with delay tags and metadata 265 associated with the commercial is depicted in FIG. 4.

In another preferred embodiment of the present invention at least one advertisement associated with at least one alternative advertisement is transmitted from the headend 15 and received at the receiver and decoder 200. The at least one advertisement is preferably tagged with a replacement tag indicating whether the user is allowed to replace displaying of the at least one advertisement by displaying of the at least one alternative advertisement.

Preferably, the processor 230 analyzes the replacement tag to determine that the at least one advertisement and the at least one alternative advertisement are not competing advertisements. Then, if the at least one advertisement and the at least one alternative advertisement are not competing advertisements, the processor 230 enables display of one of the at least one advertisement and the at least one alternative advertisement in accordance with a value of the replacement tag and a selection of the user.

It is appreciated that the replacement tag may also provide an archiving indication indicating which one of the at least one advertisement and the at least one alternative advertisement is to be archived. In such a case, one of the at least one advertisement and the at least one alternative advertisement may be archived based on the archiving indication. Preferably, archiving of one of the at least one advertisement and the at least one alternative advertisement is performed in response to a payment by an advertiser associated with a corresponding one of the at least one advertisement and the at least one alternative advertisement.

Figure 5:
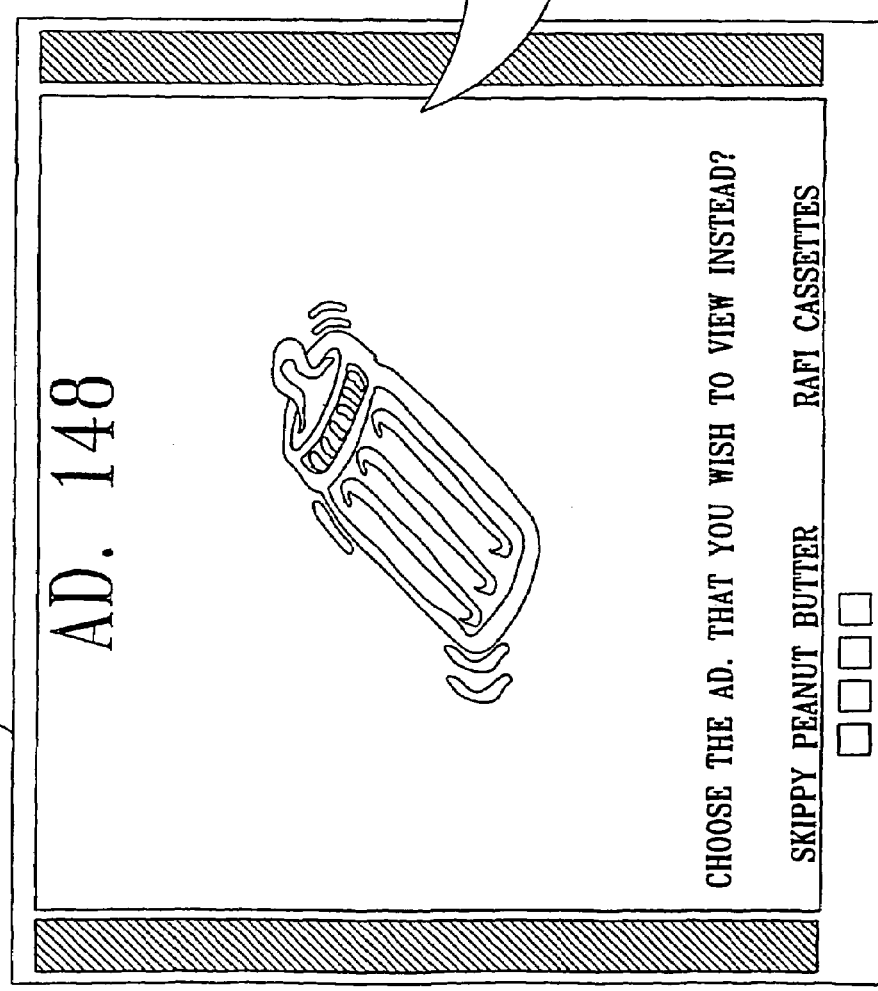
FIG. 5 is a simplified pictorial illustration of a preferred implementation of a television screen showing advertisement selection options that may be available to a user of the user unit of FIG. 3.

An example showing a preferred implementation of a television screen 270 displaying Ad selection options available to the user and metadata 275 associated with the Ad selection options is depicted in FIG. 5.

In accordance with yet another preferred embodiment of the present invention the user is enabled to transmit a recommendation of a transmitted program to a remote user of a remote user unit 20 (both not shown). It is appreciated that the transmitted program may include an advertisement.

Preferably, the user instructs the processor 230, via the I/O interface 245 by using the keyboard 235 or the remote control 240, to open an electronic message form on the display 35. The processor 230 then preferably generates the electronic message form and provides the electronic message form to the OSD 250 for display thereby on the display 35. It is appreciated that the generated electronic form may already include an identification of the transmitted program if the transmitted program is at least one of the following: highlighted; marked; and viewed by the user.

Preferably, the user fills in the electronic message form to form a recommendation message. It is appreciated that the user may preferably fill in the electronic message form at least identification details of the remote user. The user may also preferably attach a video clip message to the recommendation message.

Once the recommendation message is ready, and upon an instruction provided by the user, the processor 230 preferably provides the electronic message form to the communication interface 255 which preferably transmits the electronic message form to the headend 15 via the telephone network 30. At the headend 15, the electronic message form is preferably processed, for example at the SMS 100, to match the identification details of the remote user with valid subscriber details. The headend 15 preferably forwards the recommendation message to the remote user in response to a positive match of the identification details of the remote user with valid subscriber details.

It is appreciated that the headend 15 may also assign the transmitted program a high viewing priority for the remote user upon forwarding the recommendation message to the remote user. The high viewing priority may include a highest viewing priority.

Preferably, the user may also fill in the electronic message form authorization data authorizing the headend 15 to bill the user for the remote user viewing the transmitted program in response to the recommendation message. The authorization data may preferably include a selection of a method of payment. The method of payment preferably includes one of the following: payment from a bank account; payment by a credit card; and payment by debiting a debit card such as, for example, a smart card or any other appropriate debit card.

Additionally, the user may also fill in program related information that includes at least one of the following: a title of the transmitted program; an identification of a recommended episode; a date and a time of creation of the recommendation message; parental rating of the transmitted program; and a viewing rating assigned to the transmitted program by the user.

It is appreciated that prior to forwarding the recommendation message to the remote user, a verification check may be performed to verify an entitlement of the user to provide the recommendation message to the remote user. The verification check is preferably performed at least one of the following: the headend; the smart card 210 at the user unit 20 operated by the user; and a removable security element, such as a smart card, at the remote user unit 20. Furthermore, an additional verification check may preferably be performed to verify an entitlement of the remote user to receive the recommendation message from the user.

It is appreciated that the headend 15 preferably transmits the recommendation message to the remote user only if the remote user is served by the headend 15. If the remote user is not served by the headend 15, the headend 15 may transmit the recommendation message to an information service provider (ISP) (not shown) that serves the remote user, in which case the ISP may transmit the recommendation message to the remote user. It is appreciated that the remote user is preferably enabled to block reception of the recommendation message regardless of the recommending entity or the entity that transmits the recommendation message.

Figure 6:
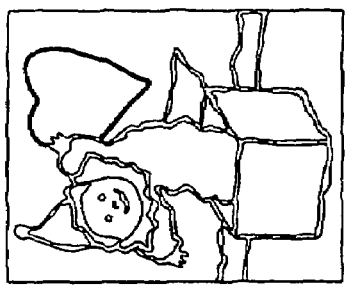
FIG. 6 is a simplified pictorial illustration of a preferred implementation of a television screen showing an example of an electronic message form that may be available to a user of the user unit of FIG. 3.

An example showing a preferred implementation of a television screen 280 displaying an example of an electronic message form 282 and metadata 285 associated with a message filled in the electronic message form is depicted in FIG. 6.

In accordance with still another preferred embodiment of the present invention the user is enabled to transmit an advertisement message to a targeted audience. In such a case, the user may create an advertisement message by entering suitable inputs via the keyboard 235 or the remote control 240. The inputs of the user preferably include a description of the advertisement message and parameters determining the targeted audience, where the parameters determining the targeted audience may include, for example, any one or more of the following: an age group of viewers; residence areas of viewers; a pre-specified field of interest of viewers; an income level of viewers; gender of viewers; and types of programs being watched by viewers. It is appreciated that other appropriate parameters determining the targeted audience may alternatively be used.

Preferably, the inputs of the user are provided to the processor 230 via the I/O interface 245, and the processor 230 preferably creates the advertisement message and associates the advertisement message with the parameters determining the targeted audience. Then, the processor 230 preferably provides the advertisement message associated with the parameters determining the targeted audience to the communication interface 255 which is operative to transmit the advertisement message associated with the parameters determining the targeted audience to the headend 15.

At the headend 15, the advertisement message and the parameters determining the targeted audience are preferably processed, for example in the broadcast center 105, to create an advertisement transmission program scheduled for broadcast to the targeted audience. The advertisement transmission program is then broadcast to the targeted audience in accordance with a programmed schedule of transmission.

It is appreciated that the user may also input parameters determining at least one of the following: an expiration date of the advertisement message; a delivery mode determining a priority of broadcast of the advertisement transmission program; and a method of payment for broadcasting the advertisement transmission program. The method of payment may include one of the following: payment from a bank account; payment by a credit card; and payment by debiting a debit card. The debit card may preferably include a smart card, such as the smart card 210.

Figure 7:
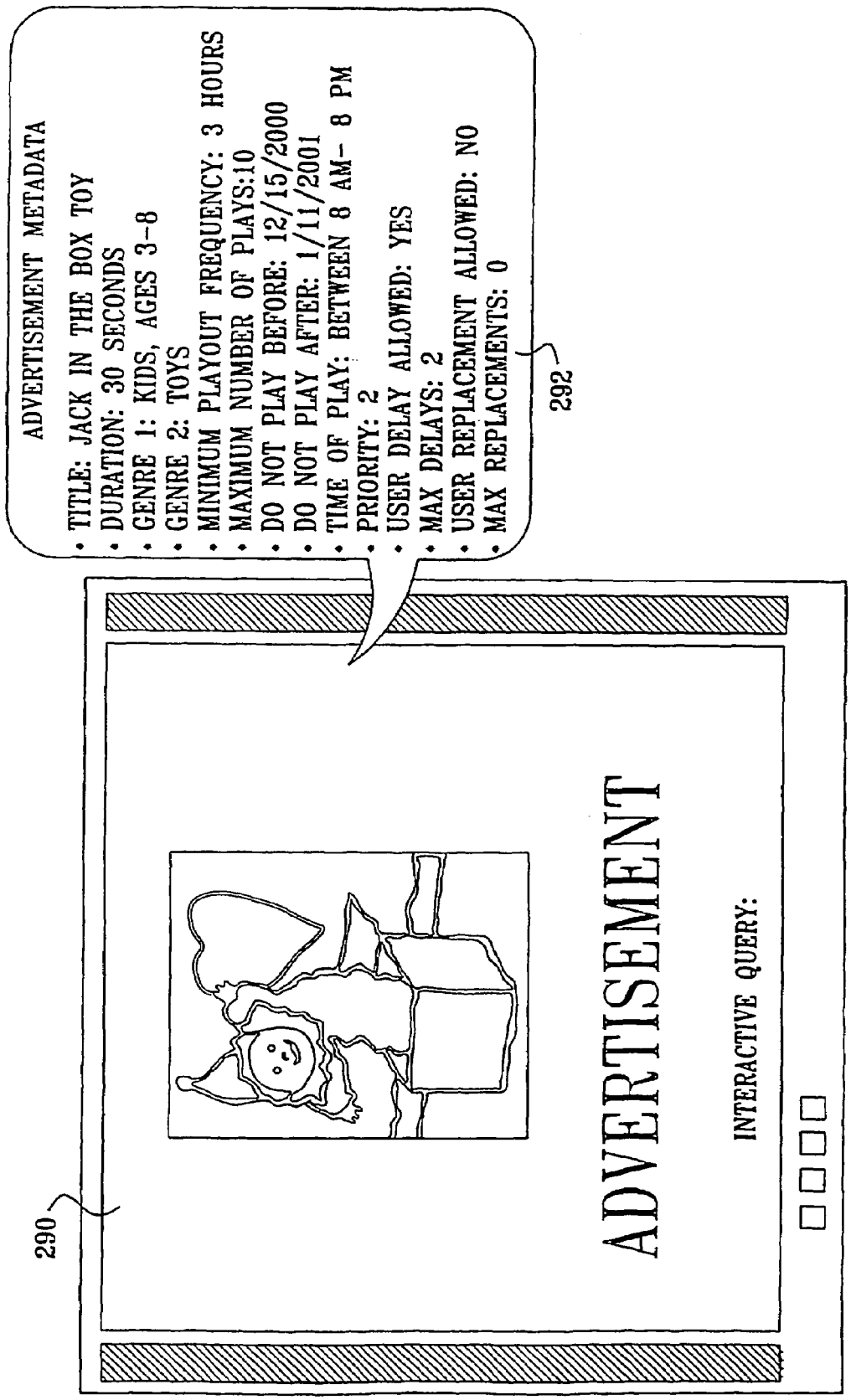
FIG. 7 is a simplified pictorial illustration of a preferred implementation of a television screen showing an example of an advertisement message for transmission to a targeted audience.

A television screen 290 displaying an example of an advertisement message for transmission to a targeted audience and metadata 292 associated with the advertisement message is depicted in FIG. 7. Further examples of advertisement messages for transmission to a targeted audience are described in U.S. Provisional Patent Applications 60/179,968 and 60/176,215 to Wachtfogel et al the disclosures of which are incorporated herein by reference.

In accordance with a preferred embodiment of the present invention a broadcast commercial that is received at the receiver and decoder 200 may be stored for future display to the user and then, based on criteria predetermined or determined in real-time, selected and displayed on the display 35. It is appreciated that storage of the broadcast commercial is preferably enabled only if there is no limitation that requires display of the commercial immediately and/or prevents storage of the commercial.

If storage of the commercial is enabled, the processor 230 preferably determines whether to store the broadcast commercial based upon at least one of the following: a predetermined preference of the user for an item being advertised in the commercial; a previous purchase of an item being advertised in the commercial; and correspondence of at least one characteristic associated with the commercial to user profile information. Then, upon the processor 230 determining to store the broadcast commercial, the commercial is preferably stored in the memory 220, optionally after compression and encryption in the compressor/decompressor 227 and the encryptor/decrypter 229 respectively.

Once the commercial is stored in the memory 220, the processor 230 may determine whether to select the broadcast commercial based upon at least one of the following: a number of times the commercial has already been displayed to the user, a number of times other commercials advertising the same item advertised by the commercial have already been displayed to the user; a type of product advertised in the commercial, an event currently being viewed; an offer induced by the metadata; a relation to other commercials; a predetermined date; and position of the commercial in a sequence of teaser commercials. Then, upon the processor 230 determining to select the broadcast commercial, the processor 230 preferably selects the commercial and places the commercial in a high priority in a display queue.

Preferably, the processor 230 determines whether to currently display the broadcast commercial based upon at least one of the following: metadata associated with content displayed to the user which indicates when a potential commercial occurs; a required frequency of a commercial break; a time of day; a time window during which the broadcast commercial is valid; analysis of an event; a request of the user, and an indication of the user that he has viewed enough. Once the processor 230 determines that the commercial can currently be displayed, the commercial is preferably provided to the OSD unit 250 which provides the commercial to the display 35 for displaying thereon.

It is appreciated that due to limitations of storage capacity at the addressed user unit 20 and/or other criteria, there may be a requirement to delete stored broadcast commercials. In such a case, the processor 230 may preferably determine whether to delete a stored broadcast commercial based upon at least one of the following: a pre-determined elapsed time period of the broadcast commercial; a number of times the broadcast commercial has been displayed; in response to receipt of an erase signal; a request of the user (if allowed) not to present commercials of a particular vendor; and a payment made to prevent the stored broadcast commercial from being deleted. Then, upon the processor 230 determining to delete the broadcast commercial, the commercial is preferably deleted from the memory 220 in the addressed user unit 20, for example, by the processor 230 transmitting a delete trigger signal in a secure mode.

The apparatus of FIGS. 1-3 also preferably enables counteracting replacement of advertisements for an item offered by a plurality of vendors so that an advertiser will not be able to tamper with advertisements of other advertisers. Alternatively, and under certain conditions, the apparatus of FIGS. 1-3 may enable replacement of advertisements for an item offered by a plurality of vendors, typically in association with a compensation for an advertiser whose advertisement has been replaced.

In a case where replacement of advertisements for an item offered by a plurality of vendors must be prevented, the MUX 125 preferably associates a video frame displaying the item with a tag indicating a valid vendor, and the transmitter 135 preferably transmits the frame in association with the tag indicating the valid vendor. It is appreciated that the tag indicating the valid vendor may be encrypted prior to association with the frame. Thus, an entity that may want to replace the advertisement of the item by an advertisement of a vendor other than the valid vendor must detect the tag and decrypt it, it being appreciated that such operations are typically difficult.

The ability to counteract replacement of advertisements for an item offered by a plurality of vendors preferably enables secure purchasing of items via a communication network utilizing the digital television system 10. Preferably, one of a plurality of vendors offering similar items may be determined as a leading vendor in response to a payment made by the leading vendor. Then, advertisements of the item and an offer to purchase the item from the leading vendor may be displayed to users of the user units 20 together with advertisements and offers to purchase the item from vendors other than the leading vendor. The users may then be enabled to purchase the item via the communication network only from the leading vendor.

In a case where replacement of advertisements for an item offered by a plurality of vendors is required, an advertisement of the item may be transmitted in association with a selection icon associated with a leading vendor from among the plurality of vendors. The advertisement of the item is then displayed on the display 35, and upon selection of the selection icon by the user, offers to purchase the item by the leading vendor and by vendors from the plurality of vendors other than the leading vendor are displayed on the display 35. Then, if the user purchases the item from a vendor other than the leading vendor by ordering the item through the headend 15, the processor 230, or the SMS 100 preferably compensates the leading vendor for the purchase of the item from a vendor other than the leading vendor.

It is appreciated that display of advertisements of a plurality of vendors, whether replacement of advertisements is or is not enabled, requires a mechanism that enables the user to search advertisements transmitted to the addressed user unit 20. In such a case, advertisements provided by the plurality of vendors and related to similar items may preferably be tagged with an advertisement category tag categorizing the advertisements according to a type of the items being advertised in the advertisements prior to transmission to the user units 20. The advertisements related to the similar items thus form a sub-group of advertisements from among all advertisements transmitted to the user units 20, and the user may access the sub-group by performing a search based on an item name or other characteristics. It is appreciated that the sub-group of advertisements, as well as all the advertisements transmitted to the user units 20, may preferably be associated with different programs.

Preferably, the sub-group of advertisements, together with additional advertisements, is received at the addressed user unit 20. Then, identification elements of all ads in the sub-group are preferably displayed in response to a selection made by the user when viewing at least one advertisement from the sub-group of ads. Preferably, identification elements of at least some of the ads in the sub-group are displayed simultaneously, for example, in a mosaic display arrangement.

It is appreciated that each identification element in the sub-group enables the user to select an advertisement associated therewith. Preferably, each identification element includes at least one of the following: an icon identifying an advertisement in the sub-group; an index identifying an advertisement in the sub-group; a code identifying an advertisement in the sub-group; an image from an advertisement in the sub-group; and a video clip of an advertisement in the sub-group.

Figure 8:
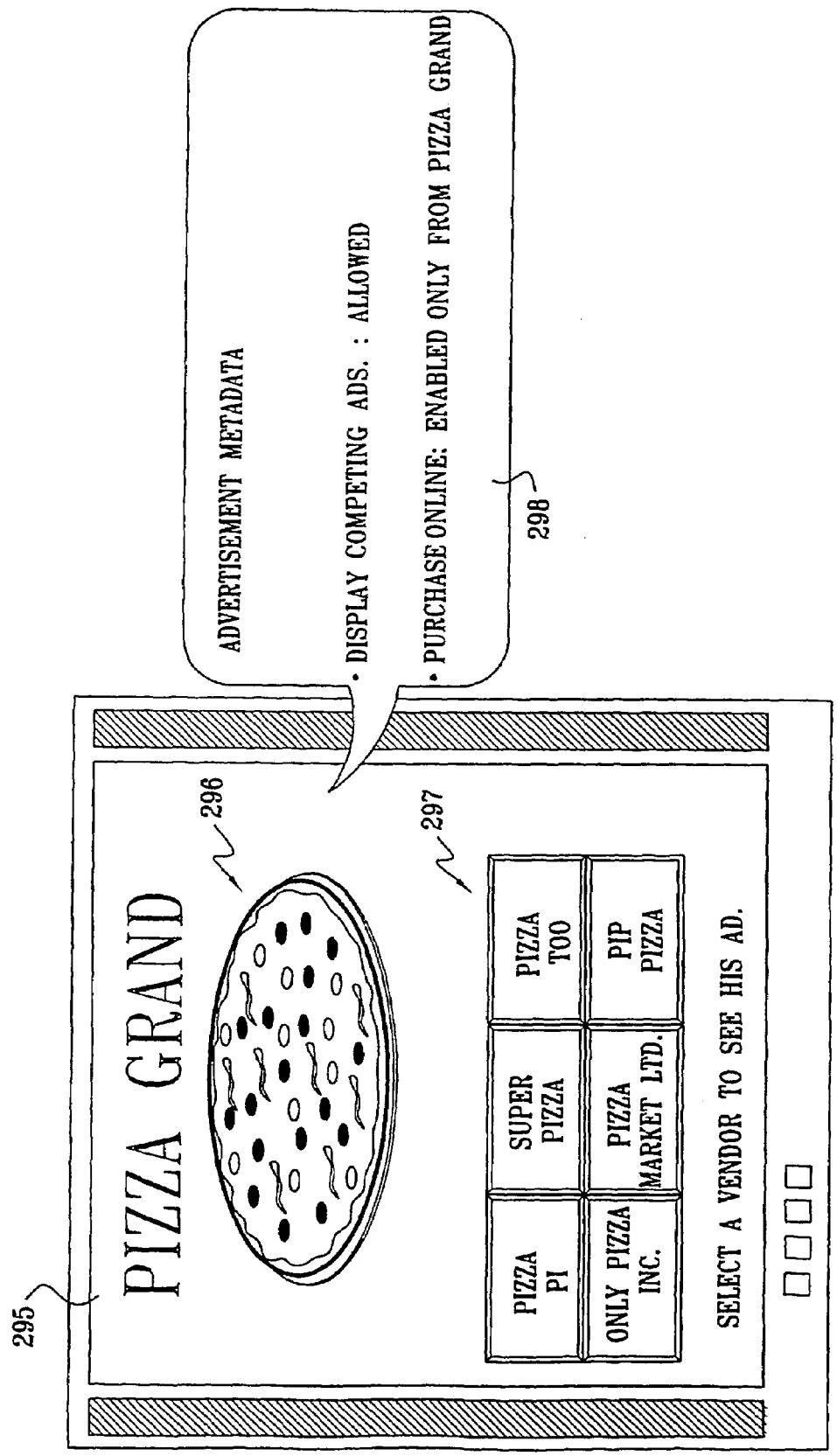
FIG. 8 is a simplified pictorial illustration of a preferred implementation of a television screen showing an arrangement of competing advertisements of a plurality of vendors offering similar items.
Figure 9A:
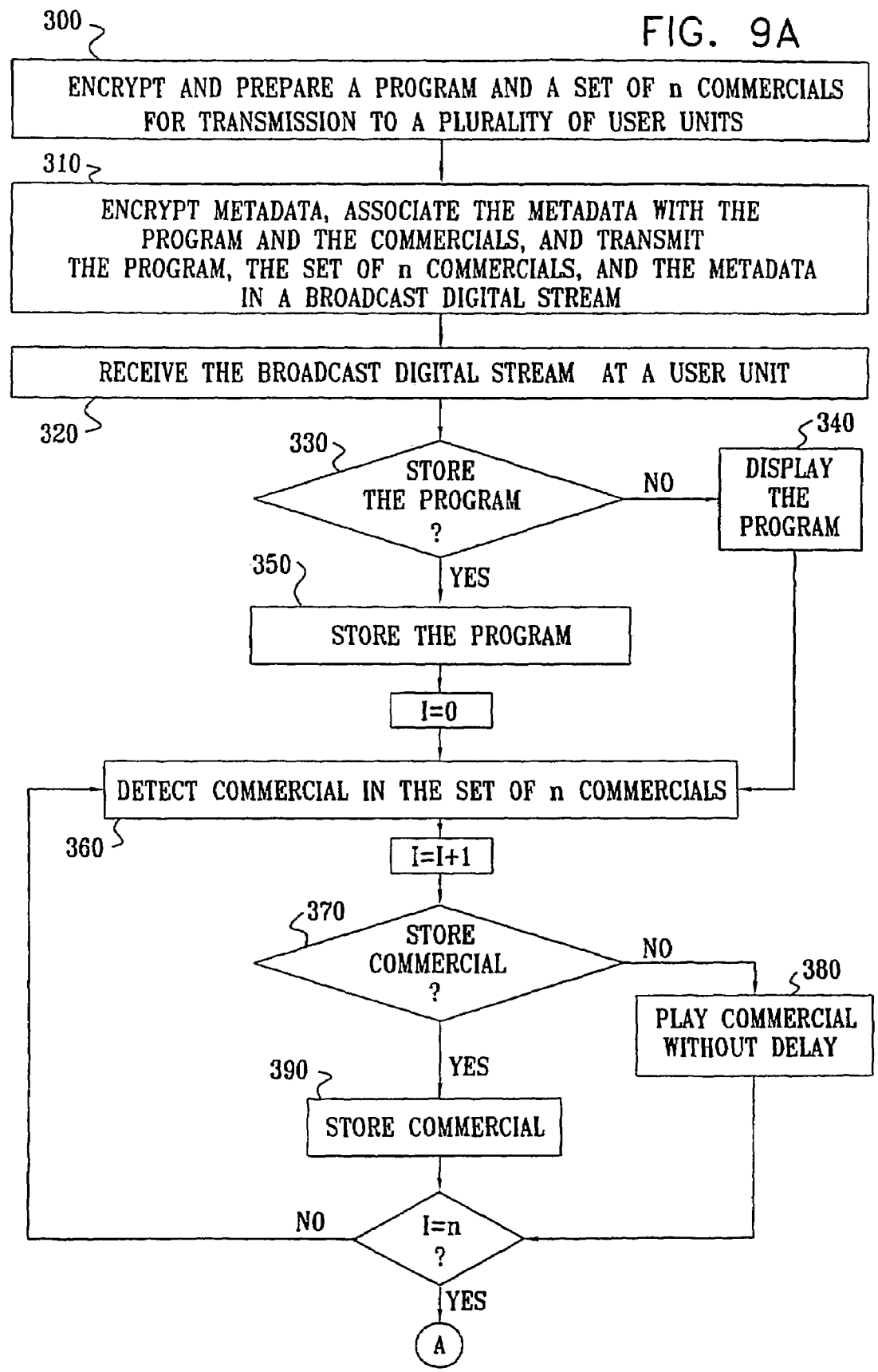
Figure 9B:
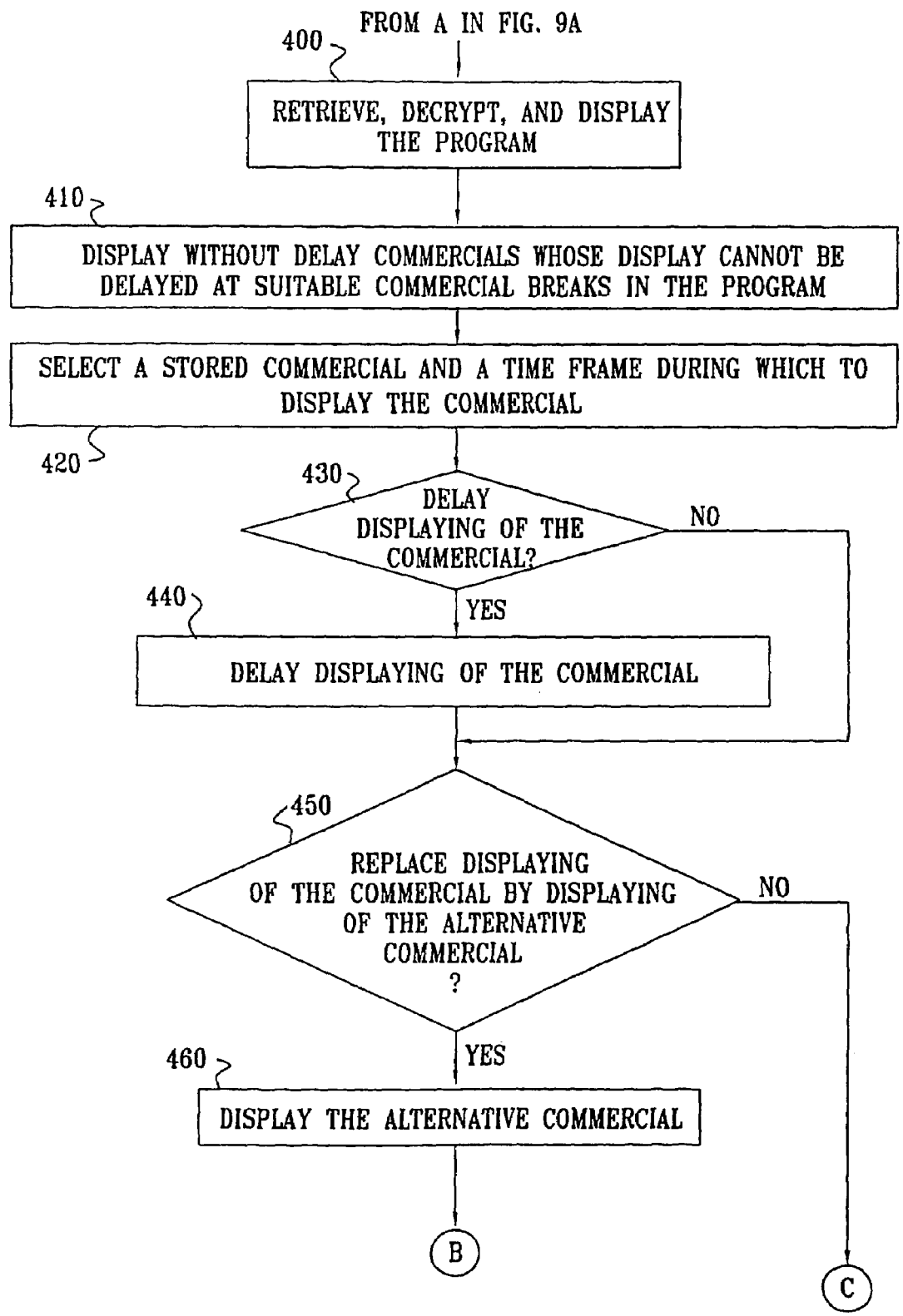
Figure 9E:
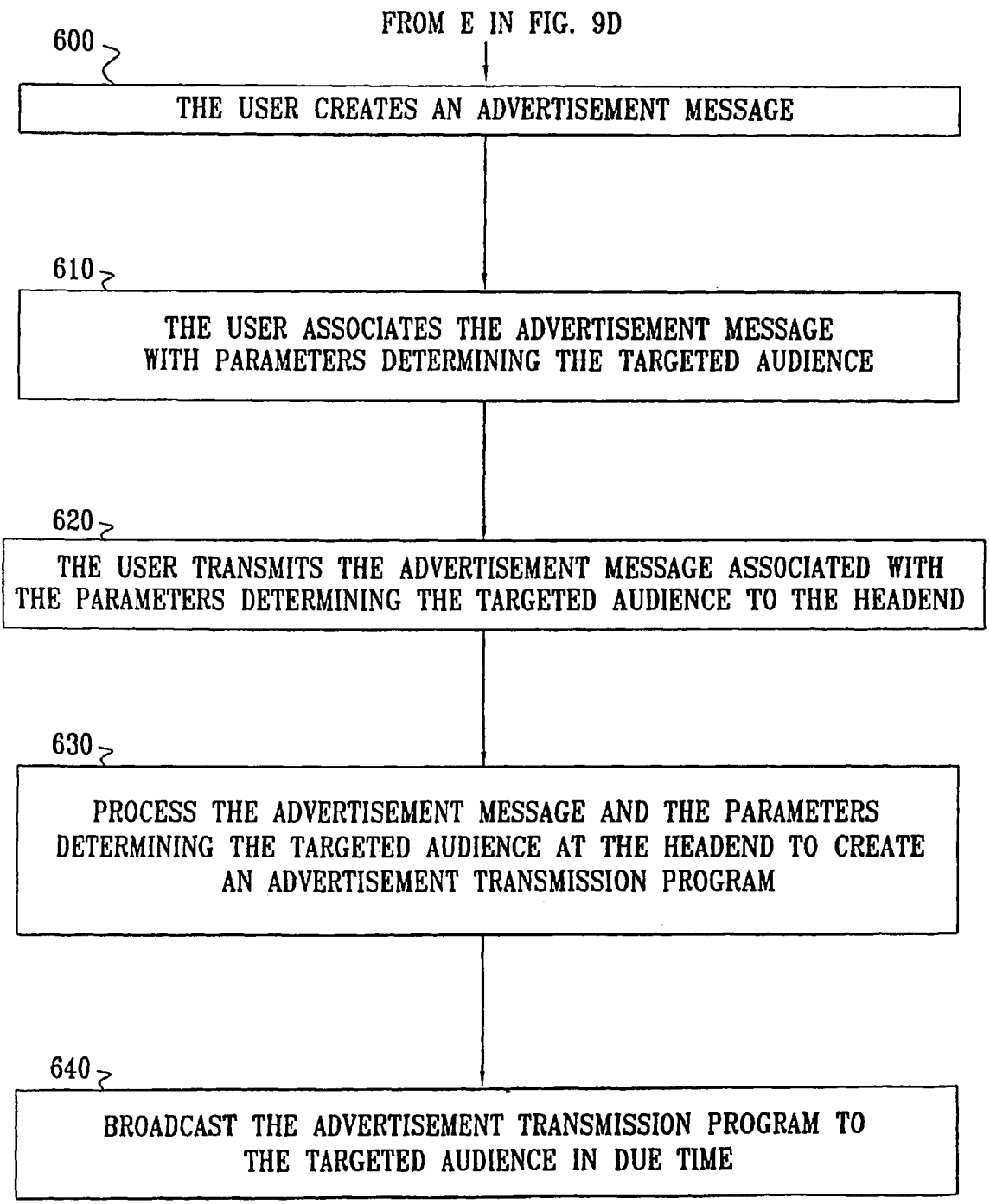

An example showing a preferred implementation of a television screen 295 displaying a leading vendor advertisement 296, a mosaic arrangement 297 of competing advertisements of a plurality of vendors offering similar items, and metadata 298 associated with the leading vendor advertisement 296 is depicted in FIG. 8.

In a case where the leading vendor must be compensated, the compensation for leading vendor may include at least one of the following: crediting an account of the leading vendor; and crediting an amount of advertisements of the leading vendor. The crediting of an amount of advertisements of the leading vendor typically includes a free-of-charge increase of the number of times advertisements of the leading vendor are displayed within a time period, or a free-of-charge display of additional advertisements of the leading vendor.

In accordance with a preferred embodiment of the present invention the user may be credited for viewing commercials and advertisers may be charged for receiving from the user indications of interest in items advertised in the commercials. For crediting the user, the processor 230 may, for example, calculate a sum of money which is a result of substituting an actual duration-of-display of advertisements associated with a program in a predetermined arithmetic function that correlates a predetermined price PR for the program to a predetermined duration-of-display DD of advertisements associated with the program.

The predetermined arithmetic function may be, for example, a linear function of the type $Y=A*X$ where $A=PR/DD$. If advertisements are displayed at the user unit 20 for an actual duration-of-display $X_0$, the user may be credited by an amount $Y_0=A*X_0$. Alternatively, rather than being billed by the sum of money PR for viewing the program, the user may be billed by a lower sum $PR-Y_0$. It is appreciated that the present invention is not limited by the type of predetermined arithmetic function that is used, and that any appropriate function may be used.

Crediting the user for viewing advertisements thus creates a mechanism of billing that is correlated to an amount of advertisements being displayed to the user. Preferably, the billing of the user is carried out by the smart card 210 or by the SMS 100, as is well known in the art If the user transmits to the headend 15, for example via the telephone network 30, reports corresponding to a commercial broadcast to a multiplicity of users, the broadcast center 105 may preferably perform at least one of the following: credit the user by an amount of credit; and charge an advertiser of the commercial by an amount of charge. It is appreciated that the amount of credit may include a predetermined amount of credit, such as a fixed amount of credit, or may be proportional to a number of the reports. It is further appreciated that additional reports including, for example, information regarding which commercials have been stored at the addressed user unit 20 and when commercials that have been stored at the addressed user unit 20 have been displayed, may also be reported back to the headend 15, and advertisers may either be charged for the additional reports or receive the additional reports free of charge.

Reference is now made to FIGS. 9A-9E which together constitute a simplified flowchart illustration of a preferred method of operation of the apparatus of FIGS. 1-3.

Preferably, a program and a set of commercials to be displayed during program breaks are encrypted and prepared at a headend for transmission to a plurality of user units (step 300). Metadata to be associated with the program and the commercials is preferably encrypted for protection and transmitted together with the program and the set of commercials in a broadcast digital stream (step 310).

The metadata may include delay tags indicating whether display of the commercials can be delayed. Additionally, the metadata may include tags indicating valid vendors associated with frames displaying advertised items in each commercial in order to prevent replacement of a commercial for an item offered by a plurality of vendors. Alternatively, if replacement of commercials for an item offered by a plurality of vendors is enabled, the metadata may include links associating the commercial with a selection icon associated with a leading vendor from among a plurality of vendors.

Further additionally, the metadata may include replacement tags indicating whether replacement of displaying commercials by displaying of alternative commercials associated therewith is allowed.

The broadcast digital stream is preferably received at a user unit (step 320) and based upon predetermined criteria or criteria determined in real-time (step 330), the program may be displayed without delay (step 340) or stored in the user unit for future display to a user of the user unit (step 350).

In order to manipulate the commercials and/or interact with the commercials, each commercial in the set of commercials is preferably detected (step 360), for example, by detecting indicia in the metadata that indicate at least one of the following: a start point of the commercial; an end point of the commercial; and a presence point within the commercial. Alternatively, each commercial may be detected by performing an analysis on content of the broadcast digital stream to detect parameters characterizing the commercial or by performing an analysis on a user behavior during display of the broadcast digital stream to detect behavior characteristics associated with user behavior during display of commercials.

Once the commercials are detected, a processor in the user unit preferably determines which of the commercials to play without delay and which of the commercials to store (step 370). Commercials to be played without delay are preferably played sequentially and without delay in commercial breaks in the program (step 380). Commercials to be stored are preferably stored, for example, in a high capacity memory (step 390), optionally after compression and encryption in a compressor/decompressor and an encryptor/decrypter respectively. It is appreciated that storage of the commercials may be performed, for example, in accordance with parameters associated with the commercials, such as a broadcaster set of parameters, an agent set of parameters and a user set of parameters as described in U.S. patent application Ser. No. 09/515,118 to Wachtfogel et al (corresponding to published PCT Application WO 00/01149), the disclosure of which is incorporated herein by reference.

It is appreciated that a determination whether to store each commercial is preferably first made by checking whether display of the commercial can be delayed and then made based, for example, upon at least one of the following: a predetermined preference of the user for an item being advertised in the commercial; a previous purchase of an item being advertised in the commercial; and correspondence of at least one characteristic associated with the commercial to user profile information.

Preferably, when the user decides to view the program that is stored in the user unit, the program is preferably retrieved from the memory, decrypted, decompressed and displayed on a television at the user unit (step 400). Commercials whose display cannot be delayed are preferably displayed without delay at suitable commercial breaks in the program (step 410).

As display of the program progresses, the processor preferably selects a stored commercial for displaying to the user and selects a time frame during which to display the commercial (step 420).

Selection of the stored commercial is preferably performed in response to a determination based upon at least one of the following: a number of times the commercial has already been displayed to the user; a number of times other commercials advertising the same item advertised by the commercial have already been displayed to the user; a type of product advertised in the commercial; an event currently being viewed; an offer induced by the metadata; a relation to other commercials; a predetermined date; and position in a sequence of teaser commercials. Selection of the time frame during which to display the commercial is preferably performed in response to a determination based upon at least one of the following: metadata associated with content displayed to the user which indicates when a potential commercial occurs; a required frequency of a commercial break; a time of day; analysis of an event, a request of the user, and an indication of the user that he has viewed enough.

If the user is allowed to delay displaying of the commercial (step 430), the user may perform a selection which delays display of the commercial (step 440).

If the user is allowed to replace displaying of the commercial by displaying of an alternative commercial (step 450) the user may select displaying of one of the commercial and the alternative commercial (step 460).

If replacement of commercials for an item offered by a plurality of vendors is allowed (step 470), the user may indicate a selection by, for example, operating a selection icon, and may purchase the item from the leading vendor or from a vendor other than the leading vendor from among the plurality of vendors (step 480). In a case where the user purchases the item from a vendor other than the leading vendor (step 490), the leading vendor may be compensated (step 500), via the headend, for the purchase of the item from a vendor other than the leading vendor.

It is appreciated that users may be compensated for viewing of commercials by billing the users by a sum which decreases with an amount of commercials viewed by the users and/or by crediting the users by an amount of credit in response to providing feedback reports on the commercials. It is further appreciated that advertisers may be charged for receiving feedback reports on the commercials from the users.

Preferably, during or after viewing the program or a commercial, the user may decide to transmit a recommendation of the program or a commercial to a remote user (step 510). In such a case, the user may open an electronic message form on the television (step 520) which preferably already includes an identification of the program if the program is at least one of the following: highlighted; marked; and viewed by the user, and fill in the electronic message form with at least identification details of the remote user to form a recommendation message (step 530). The electronic message form is then transmitted to the headend (step 540).

At the headend, the electronic form is processed to match the identification details of the remote user with valid subscriber details (step 550), and if the identification details of the remote user match valid subscriber details (step 560) the recommendation message is preferably forwarded to the remote user (step 570). It is appreciated that if the identification details of the remote user do not match valid subscriber details, an error message is preferably transmitted to the user (step 580).

Preferably, during, before, or after viewing the program or a commercial, the user may also preferably decide to transmit an advertisement message to a targeted audience (step 590). In such a case, the user may create an advertisement message (step 600), associate the advertisement message with parameters determining the targeted audience (step 610) and transmit the advertisement message associated with the parameters determining the targeted audience to the headend (step 620).

At the headend, the advertisement message and the parameters determining the targeted audience are preferably processed to create an advertisement transmission program scheduled for broadcast to the targeted audience (step 630), and broadcast to the targeted audience in due time (step 640).

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination. For example, the method described with reference to FIGS. 9A-9E need not be carried out as a whole or following the sequence described above, but rather in accordance with preferences of the user of the user unit. Thus, the user may, for example, only decide to delay display of a commercial associated with the program and resume viewing of the program. The commercial is then stored in the memory in response to a selection of the user of delaying display of the commercial, and retrieved from the memory and displayed after a predetermined delay period or a delay period selected by the user.

The user may also decide, at a time when a commercial associated with an alternative commercial is about to be displayed, to select viewing the alternative commercial.

Furthermore, at a time when a commercial that enables purchase of an item via communication with the headend is displayed, the user may check whether the item may be purchased from vendors other than the leading vendor, and purchase the item from the leading vendor or from a vendor other than the leading vendor.

At any appropriate stage, the user may decide to transmit a recommendation of the program or a commercial to a remote user in which case the user may follow the procedure described above with reference to transmission of recommendations of programs or commercials.

Similarly, the user may decide, at any appropriate stage, to transmit an advertisement message to a targeted audience in which case the user may follow the procedure described above with reference to transmission of advertisement messages to target audiences.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination. It is further appreciated that persons skilled in the art will be capable of implementing various features of the present invention that are presented as any of hardware, firmware, or software in any appropriate one or combination of hardware, firmware, and software.

It will be appreciated by persons skilled in the art that the present invention is not limited by what has been particularly shown and described hereinabove. Rather the scope of the invention is defined only by the claims which follow:

What is claimed is:

1. A method for displaying advertisements at a user unit comprising a receiver and a processor, the method comprising:

receiving, at the receiver, at least one advertisement for an item, said at least one advertisement associated with:

at least one alternative advertisement for a different item or for said item offered by a different vendor; and advertisement metadata comprising: a replacement indication indicating whether a user of said user unit is allowed to replace displaying of said at least one advertisement by displaying of said at least one alternative advertisement; and an indication of a maximum number of times said at least one advertisement can be replaced;

receiving, at the receiver, user configuration metadata comprising an indication of a maximum number of user replacements of advertisements per day;

analyzing at the processor said advertisement metadata and said user configuration metadata;

determining based on said analyzing if the user is allowed to replace displaying of said at least one advertisement by displaying of said at least one alternative advertisement; and replacing, if the user is allowed based on said determining, displaying of said at least one advertisement by displaying said at least one alternative advertisement in accordance with a selection of the user.

2. The method according to claim 1 and also comprising, prior to said displaying:

determining whether said at least one advertisement and said at least one alternative advertisement are competing advertisements; and performing said displaying based, at least in part, on a result of said determining.

3. The method according to claim 1 and wherein said replacement indication also provides an archiving indication indicating which one of said at least one advertisement and said at least one alternative advertisement is to be archived, and the method also comprises:

archiving one of said at least one advertisement and said at least one alternative advertisement based, at least in part, on said archiving indication.

4. The method according to claim 3 and wherein said archiving comprises:

archiving one of said at least one advertisement and said at least one alternative advertisement in response to payment by an advertiser.

5. The method according to claim 1 and wherein each of said at least one advertisement and said at least one alternative advertisement comprises at least one of the following:

a video clip;
   a still image; and
   audio.

6. The method according to claim 1 and wherein each of said at least one advertisement and said at least one alternative advertisement comprises a combination comprising at least two of the following:

a video clip;
   a still image; and
   audio.

7. The method according to claim 1 and also comprising storing current user interactivity metadata which comprises at least one of the following: an indication of a number of advertisement replacements executed in a current day; and a number of advertisement replacements executed upon the at least one advertisement.

8. The method according to claim 1, said user unit further comprising a memory, wherein said at least one alternative advertisement, said advertisement metadata, and said user configuration metadata are stored in said memory.

9. A user unit for displaying advertisements, the user unit comprising:
   a receiver operative to receive:
      at least one advertisement for an item, said at least one advertisement associated with:
         at least one alternative advertisement for a different item or for said item offered by a different vendor; and
         advertisement metadata comprising: a replacement indication indicating whether a user of said user unit is allowed to replace displaying of said at least one advertisement by displaying of said at least one alternative advertisement; and an indication of a maximum number of times said at least one advertisement can be replaced; and
      wherein said receiver is further operative to receive user configuration metadata comprising an indication of a maximum number of user replacements of advertisements per day; and said user unit further comprises:
   a processor operatively associated with said receiver and operative to:
      analyze said advertisement metadata and said user configuration metadata and produce a result;
      make a determination based on said result if the user is allowed to replace displaying of said at least one advertisement by displaying of said at least one alternative advertisement; and
      provide said at least one alternative advertisement to a display for display thereby in accordance with a selection of the user, if the user is allowed based on said determination.

10. The user unit according to claim 9 and wherein said processor is also operative to make a determination of whether said at least one advertisement and said at least one alternative advertisement are competing advertisements, and to provide said one of said at least one advertisement and said at least one alternative advertisement to the display for display thereby based, at least in part, on a result of said determination.

11. The user unit according to claim 9 and wherein said replacement indication also provides an archiving indication indicating which one of said at least one advertisement and said at least one alternative advertisement is to be archived, and the processor is also operative to archive one of said at least one advertisement and said at least one alternative advertisement in a memory based, at least in part, on said archiving indication.

12. The user unit according to claim 11 and wherein the processor is operative to archive one of said at least one advertisement and said at least one alternative advertisement in response to payment by an advertiser.

13. The user unit according to claim 9 and wherein each of said at least one advertisement and said at least one alternative advertisement comprises at least one of the following:
   a video clip;
   a still image; and
   audio.

14. The user unit according to claim 9 and wherein each of said at least one advertisement and said at least one alternative advertisement comprises a combination comprising at least two of the following:
   a video clip;
   a still image; and
   audio.

15. The user unit according to claim 9 and also comprising a memory operative to store said advertisement metadata and said user configuration metadata.

16. The user unit according to claim 9 and also comprising a memory operative to store current user interactivity metadata which comprises at least one of the following: an indication of a number of advertisement replacements executed in a current day; and a number of advertisement replacements executed upon the at least one advertisement.

17. A user unit for displaying advertisements, the user unit comprising:
   means for receiving:
      at least one advertisement for an item, said at least one advertisement associated with:
         at least one alternative advertisement for a different item or for said item offered by a different vendor; and
         advertisement metadata comprising: a replacement indication indicating whether a user of said user unit is allowed to replace displaying of said at least one advertisement by displaying of said at least one alternative advertisement; and an indication of a maximum number of times said at least one advertisement can be replaced; and
   means for receiving user configuration metadata comprising an indication of a maximum number of user replacements of advertisements per day;
   means for analyzing said advertisement metadata and said user configuration metadata;
   means for determining based on said analyzing the user is allowed to replace displaying of said at least one advertisement by displaying of said at least one alternative advertisement; and
   means for providing said at least one alternative advertisement to a means for displaying for display thereby in accordance with a selection of the user if if the user is allowed based on said determining.

* * * * *